United States Patent
Shieh et al.

(10) Patent No.: US 6,329,914 B1
(45) Date of Patent: *Dec. 11, 2001

(54) THICKNESS MEASUREMENT SYSTEM AND METHOD FOR VEHICLE OCCUPANT DETECTION

(75) Inventors: Shiuh-An Shieh, Alpharetta; James Frederick Kirksey, Conyers, both of GA (US)

(73) Assignee: NEC Technologies, Inc., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/678,215

(22) Filed: Sep. 29, 2000

Related U.S. Application Data

(63) Continuation-in-part of application No. 09/413,099, filed on Oct. 6, 1999.
(60) Provisional application No. 60/195,590, filed on Apr. 6, 2000.

(51) Int. Cl.[7] .................................................. G08B 13/26
(52) U.S. Cl. .................. 340/561; 340/562; 280/735; 180/271
(58) Field of Search .................................. 340/425.5, 436, 340/438, 551, 552, 561, 562; 180/271, 273; 280/728.1, 728.2, 734, 735

(56) References Cited

U.S. PATENT DOCUMENTS

| 5,366,241 | 11/1994 | Kithil | 280/735 |
|---|---|---|---|
| 5,404,128 | 4/1995 | Ogino et al. | 340/425.5 |
| 5,602,734 | 2/1997 | Kithil | 701/45 |
| 5,691,693 | 11/1997 | Kithil | 340/439 |
| 5,724,024 | 3/1998 | Sonderegger et al. | 340/562 |
| 5,802,479 | 9/1998 | Kithil et al. | 701/45 |
| 5,808,552 * | 9/1998 | Wiley et al. | 340/573.1 |
| 5,844,415 | 12/1998 | Gershenfeld et al. | 324/663 |

(List continued on next page.)

FOREIGN PATENT DOCUMENTS

| 10-236271 | 11/2000 | (JP) . |
|---|---|---|
| WO 97/39920 | 10/1997 | (WO) . |
| WO 99/05008 | 2/1999 | (WO) . |
| WO 00/50261 | 8/2000 | (WO) . |

OTHER PUBLICATIONS

Joseph A. Paradiso and Neil Gershenfeld, Musical Applications of Electric Field Sensing; Oct. 1995; pp. 1–25.
National Highway Traffic Safety Administration; Docket No. NHTSA 98–4405; Notice 1.
National Highway Traffic Safety Administration; Docket No. NHTSA 98–3847; Aug. 4, 1998; vol. No. 63, No. 149.
Kazunori Jinno; Occupant Sensing Utilizing Perturbation of Electric Fields; Feb., 1997; pp. 117–129.
J. R. Smith; Field Mice: Extracting Hand Geometry From Electric Field Measurements; 1996; pp. 587–608.

*Primary Examiner*—Van T. Trieu
(74) *Attorney, Agent, or Firm*—Craig A. Summerfield; Brinks Hofer Gilson & Lione

(57) ABSTRACT

A passenger detection system is provided. The passenger detection system utilizes an oscillation circuit that causes an antenna electrode to emit an electric field that is disrupted by the electrical characteristics of an object placed on the seat. This disruption alters the current and phase of the signal in the antenna electrode. By comparing the current flowing in the antenna electrode and/or the difference between the phase of the signal in the antenna electrode and the oscillation circuit output signal with predetermined threshold values, it is possible to detect the presence of a passenger in a reliable and inexpensive manner. The determination is made with a two layer electrode arrangement, including smaller and larger electrodes. The two layers allow calculation of an amount of compression on the seat. The amount of compression is used to characterize the passenger.

35 Claims, 9 Drawing Sheets

U.S. PATENT DOCUMENTS

| | | | |
|---|---|---|---|
| 5,844,486 | 12/1998 | Kithil et al. | 340/573.4 |
| 5,878,620 | 3/1999 | Gilbert et al. | 73/172 |
| 5,914,610 | 6/1999 | Gershenfeld et al. | 340/870.37 |
| 5,936,412 | 8/1999 | Gershenfeld et al. | 324/663 |
| 5,948,031 | 9/1999 | Jinno et al. | 701/45 |
| 6,012,007 | 1/2000 | Furtune et al. | 340/436 |
| 6,014,602 * | 1/2000 | Kithil et al. | 701/45 |
| 6,043,743 | 3/2000 | Saito et al. | 340/562 |

* cited by examiner

TOP LAYER

BOTTOM LAYER

POLYURETHANE INSULATOR
5" SPACING BETWEEN ANTENNAE (EXCEPT E SHAPED ANTENNA)

THICKNESS MEASUREMENT SYSTEM AND METHOD FOR VEHICLE OCCUPANT DETECTION

CROSS REFERENCE TO RELATED APPLICATION

This application is a continuation-in-part of co-pending U.S. patent application Ser. No. 09/413,099, filed Oct. 6, 1999, which is incorporated herein by reference. This application claims the benefit of the filing date pursuant to 35 U.S.C. §119(e) of Provisional Application Ser. No. 60/195,590, (Attorney Docket No. 9415/9020) filed Apr. 6, 2000, the disclosure of which is hereby incorporated by reference.

BACKGROUND

The present invention is related to passenger detection systems, and in particular to passenger detection systems that can readily classify an attribute of a passenger of an automobile in which an air bag device is installed.

In general, air bag devices are used to ease the shock that a passenger experiences during an automobile collision, and as such must be stored in a stable condition in the automobile. Air bags are installed in front of the driver's and passenger's seats. Air bags may be installed in other locations.

In a typical air-bag system, the control system includes a control circuit that receives a signal from an electrical acceleration sensor (shock detection sensor), and transmits control signals to the gates of normally-open semiconductor switching elements. The switching elements are respectively connected in parallel paths between a system operating voltage and ground. Each path includes a safing sensor, a squib circuit and the switching element. The squib circuits are connected to the gas sources of the air bag devices respectively mounted on the automobile in front of the driver's seat and the front passenger seat or other locations (e.g. side airbags).

In operation, the air bag control system only deploys the driver and passenger air bags when both of the safing sensors close, and when the electrical acceleration sensor closes. In particular, the acceleration detection mechanisms of the safing sensors close their respective normally-open switches in response to an acceleration that is relatively small in comparison to the acceleration necessary to close the electrical acceleration sensor. When closed, the safing sensor applies a high voltage signal to the control circuit and to first terminals of the squib circuits. The high voltage signals from the safing sensor cause the control circuit to enter into an operational mode. Next, the control circuit confirms that the automobile is in an accident based on the signal from the electrical acceleration sensor. If the electrical acceleration sensor also detects the acceleration, the control circuit transmits control signals that close the switching elements. As a result, current flows from the system operating voltage to ground through each of the squib circuits, thereby causing respective gas sources to deploy (inflate) the driver-side air bag and the passenger-side air bag. Once deployed, the air bags protect the driver and passenger from the shock of the collision.

Passenger-side air bags are typically designed to deploy in front of the torso of an adult passenger seated in the front passenger seat. When a rear facing infant seat (hereafter RFIS) is located on the front passenger seat, it is desirable for the passenger-side air bag not to deploy. It may also be desirable for the passenger-side air bag not to deploy when a forward facing child seat (hereafter "FFCS") or child is used.

Several passenger detection sensor types have been proposed for detecting a RFCS, an FFCS or children. Such proposed sensors include (1) a weight sensor and (2) an optics sensor and image processor. The weight sensor may incorrectly detect a heavy child, or fail to detect a lightweight adult. Further, if a heavy object (such as a bag of groceries) is placed on the seat, the air bag device may be needlessly deployed in an accident. The optics sensor is expensive and the processing equipment is complex.

Since airbags deploy forcefully and quickly, sensors for determining whether any passenger is in a desirable or undesirable location are desired. Such sensors may prevent injury. By avoiding deployment of the airbag when no passenger present, replacement costs may be avoided.

SUMMARY

The present invention is defined by the following claims, and nothing in this section should be taken as a limitation on those claims. By way of introduction, the preferred embodiment described below includes a passenger detection system that accurately detects the presence of a passenger. The passenger detection system utilizes two layers of electrodes separated by a compressible insulator. By alternately grounding and disconnecting an electrode on one layer, signals from an electrode on the other layer are used to determine a distance between the electrodes. The distance is used to estimate a weight, load or distance from a seat of an occupant.

In accordance with a first aspect, a vehicle passenger detection system for sensing a characteristic of a passenger in a passenger seating area is provided. A vehicle seat having an outer surface adjacent to the passenger seating area is provided. A first electrode connects with a first portion of the vehicle seat a first distance from the outer surface, and a second electrode connects with the first portion of the vehicle seat at a second, different distance from the outer surface. The second electrode comprises a smaller area than the first electrode. A compressible insulator between the first and second electrodes.

In accordance with a second aspect, a vehicle passenger detection system for sensing a characteristic of a passenger in a passenger seating area is provided. A plurality of electrodes are arranged in at least two layers. The electrodes of one of the at least two layers are separated from the electrodes of another of the at least two layers by a compressible insulator. A switch connects at least one the plurality of electrodes to ground. A controller is operable to determine a distance between the at least two layers as a function of information received from a first of the plurality of electrodes while a second of the plurality of electrodes is grounded.

In accordance with a third aspect, a vehicle passenger detection method for sensing a characteristic of a passenger in a passenger seating area is provided. A first electrode is connected to ground. A first signal at a second electrode is measured while the first electrode is connected to ground. The first electrode is electrically disconnected. A second signal at the second electrode is measured while the first electrode is electrically disconnected. The characteristic of the passenger in a vehicle seat is determined as a function of the first and second signals.

In accordance with a fourth aspect, a vehicle passenger detection method for sensing an effect of a passenger in a passenger seating area is provided. A first electrode is connected to ground. A first signal is measured at a second electrode while the first electrode is connected to ground.

The second electrode is separated from the first electrode by a compressible insulator in a vehicle seat. A distance between the first and second electrodes is determined as a function of the first signal.

BRIEF DESCRIPTION OF THE DRAWINGS

FIGS. 1(a) and 1(b) are diagrams showing the basic operation of a passenger detection system utilizing electric field transmissions, wherein FIG. 1(a) shows an undisturbed electrical field distribution between two electrodes, and FIG. 1(b) shows an electrical field distribution when an object is present between the two electrodes.

DETAILED DESCRIPTION OF THE INVENTION

The Figures show various embodiments that utilize two or more electrodes to detect the presence of a passenger. The two or more electrodes are positioned to be adjacent to each other but at different depths from a passenger seating area. To distinguish the impact of the size of a load from the impact of the distance of the load from the sensors, the electrodes are placed at different distances from the load.

Figure 1A:
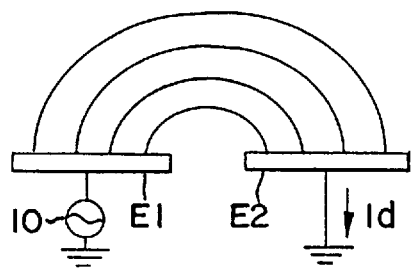
Figure 1B:
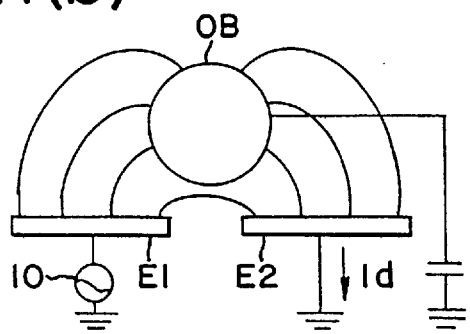

Referring to FIGS. 1(a) and 1(b), minute electric fields between two electrodes positioned in the passenger seat are detected. An electric field is created as a result of the potential difference between the electrode E1 and the electrode E2 when a high-frequency, low-voltage signal is transmitted to electrode E1 from an oscillation circuit 10, and the electrode E2 is connected to a ground. This electric field produces a current Id (the receive current) flowing from the electrode E2 to ground. If a body OB is present in the electric field, disturbances in the electric field alter the current Id1. Likewise, a current (the loading current) provided to the electrode E1 is also altered in response to the presence of the body OB regardless of the presence of the second electrode E2.

The body OB acts as a capacitor having one terminal connected to ground. In particular, the impedance (resistance and capacitance) of the body OB shunts the electric field to ground. When the body OB is in the vehicle seat, changes in the current flowing at the electrodes E1 and E2 occur in response to the electrical characteristics of the body OB. For example, the loading current is larger for closer and/or larger bodies. Using this phenomenon, the presence of a passenger, whether the driver or another occupant, in the seat is detected by comparing the detected current with a known value. In particular, one or more characteristics of the object in the seat are obtained, including whether or not the object is an adult-sized person sitting normally in the seat. By using electrodes at known or predictable different distances from the object, even more information is obtained. Therefore, the presence of a passenger in the seat is precisely detected.

Figure 2:
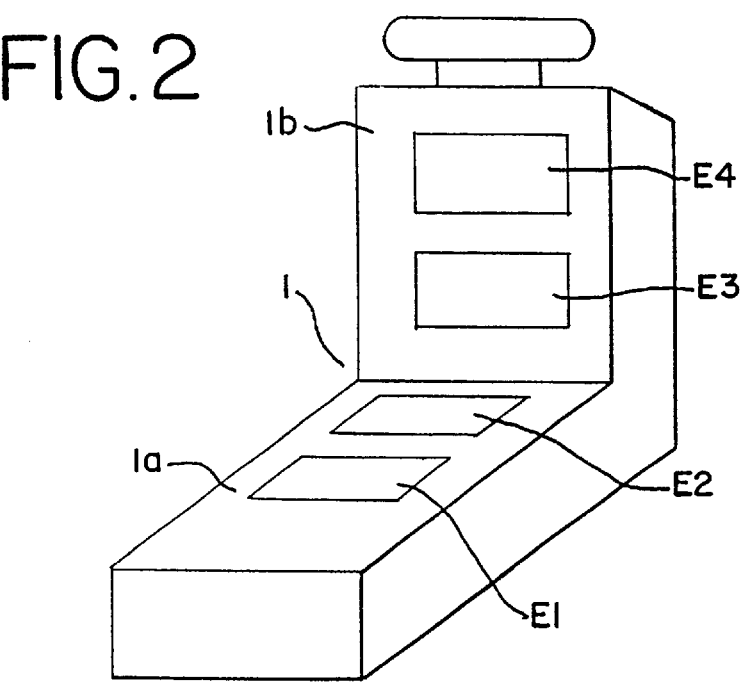
FIG. 2 is a perspective view showing a seat in the passenger detection system according to a first embodiment of the present invention.

FIG. 2 is a perspective view showing a seat 1 incorporating electrodes E1 through E4 of the passenger detection system in accordance with the first embodiment, which are formed from rectangular sheets of conductive material. Each electrode is the same or different shapes than other electrodes, and any shapes may be used, including square, spiral, rectangular, oval, circular, donut shaped, rectangular with a hollow center or other polygonal and/or rounded shapes. The electrodes E1 through E4 include metal fibers sewn into the seat cover fabric, conductive paint applied to the surface of the seat, conductive tape or metal plates installed under the seat cushion. Specifically, the electrodes E1 and E2 are mounted on the base portion 1a of the seat 1, and the electrodes E3 and E4 are mounted on the back portion 1b. These electrodes are positioned with respect to anticipated seating positions of a passenger to be adjacent to the passenger seating are, and are mounted to facilitate seating comfort. In alternative embodiments, more or fewer electrodes in the same or different positions may be used, such as using seven electrodes in the seat back portion (e.g. six arranged vertically in the center of the seat back and one on a seat edge nearest the door) with no electrodes on the seat bottom portion. In other embodiments, the electrodes are positioned at other locations, such as on the floor, in the dash, in the door, in the roof or combinations thereof. The electrodes are adjacent each other in the same area or portion of the vehicle.

The electrodes E1–E4 are arranged in two or more layers. Preferably, each pair of electrodes in a same portion of the seat are at two different distances from the outer surface of the seat. For example, the electrodes E1 and E2 on the same base portion 1a of the seat 1 are spaced at different depths from the outer surface of the seat 1. Likewise, the electrodes E3 and E4 on the same back portion of the seat 1 are spaced at different depths from the outer surface of the seat 1.

Figure 9:
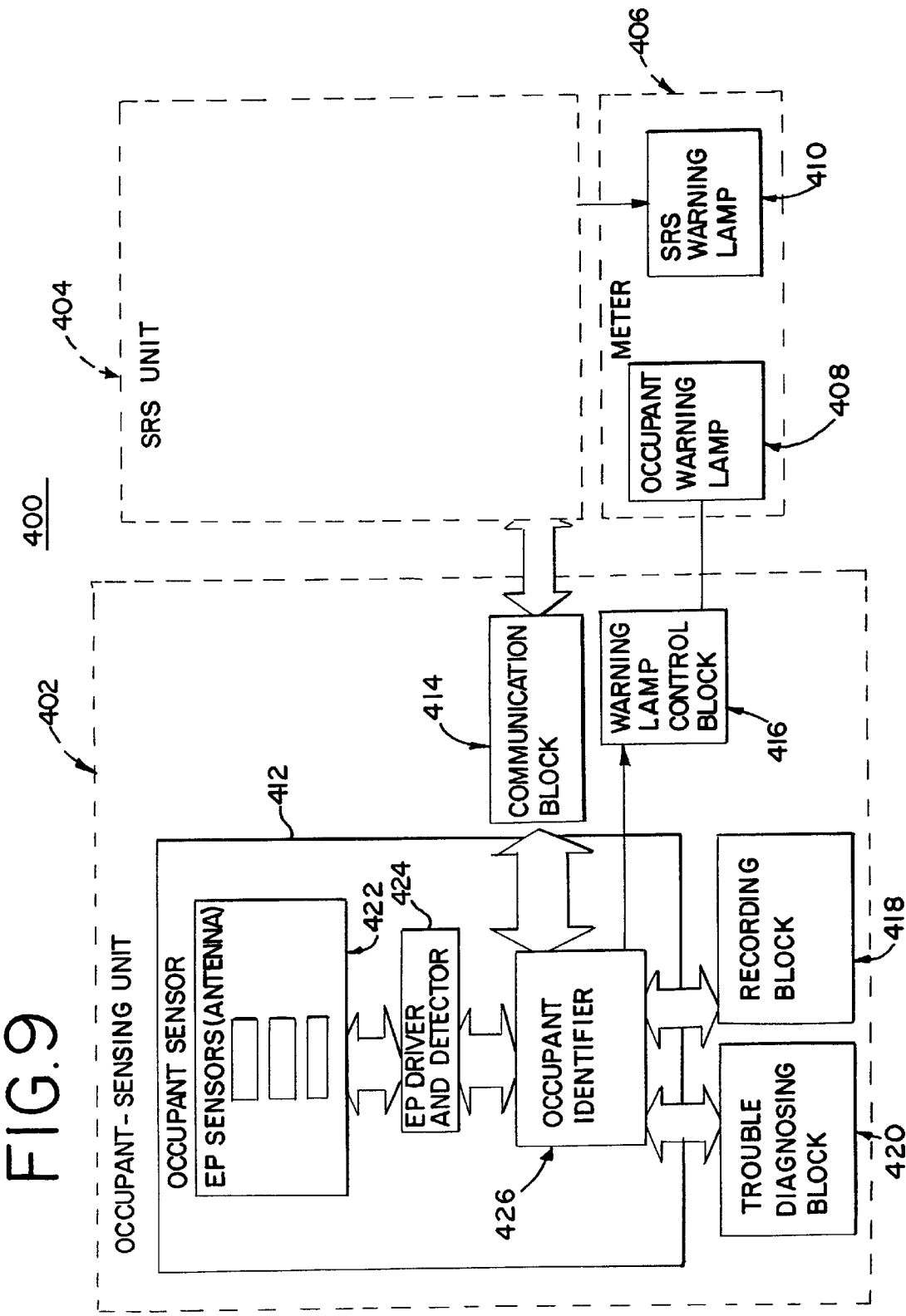
FIG. 9 is a block diagram showing another embodiment of a passenger detection system.

FIG. 9 shows one general embodiment for a passenger detection system 400. The system 400 includes a occupant sensing unit 402, a supplementary restraint system (SRS) 404 and a display meter 406. The occupant sensing unit 402 provided control signals to the SRS 404 to disable or enable air bag activation. A warning lamp signal is provided to a occupant warning lamp 408 of the display meter 406. The occupant warning lamp 408 indicates the classification of the occupant determined by the occupant sensing unit 402. Alternatively, the occupant warning lamp 408 indicates whether the SRS 404 is enabled or disabled. An SRS warning lamp 410 indicates whether the SRS 404 is operative.

The occupant sensing unit 402 includes an occupant sensor 412 for detecting the size and/or sitting posture of an occupant to determine whether to enable the SRS 404 at a low level of power for deployment, a high level of power for deployment or disable the SRS 404. A communication block 414 communicates either bi-directionally or unidirectionally with the SRS 404. A warning lamp control block 416 activates the occupant warning lamp 408 as discussed above. An optional recording block 418 records any failure codes of the occupant sensing unit 402 and/or the various characterizations of any occupant determined by the occupant sensing unit 402. An optional trouble diagnosing block 420 determines whether the occupant sensing unit 402 is operating properly and provides for external communications with the occupant sensing unit 402.

The occupant sensor 412 includes an array of electric field sensors 422, an electric field driver and detector 424 and an occupant identifier 426. The electric field sensors 422 comprise electrodes distributed at two different depth positions relative to a passenger seating area for emitting electric fields. The electric field driver and detector 424 comprise an oscillator and current measuring circuitry for generating the electric fields with the electric field sensors and measuring receive and/or loading currents, respectively. The occupant identifier 426 comprises a processor or analog circuitry for classifying any occupant as a function of the measured currents.

Figure 3:
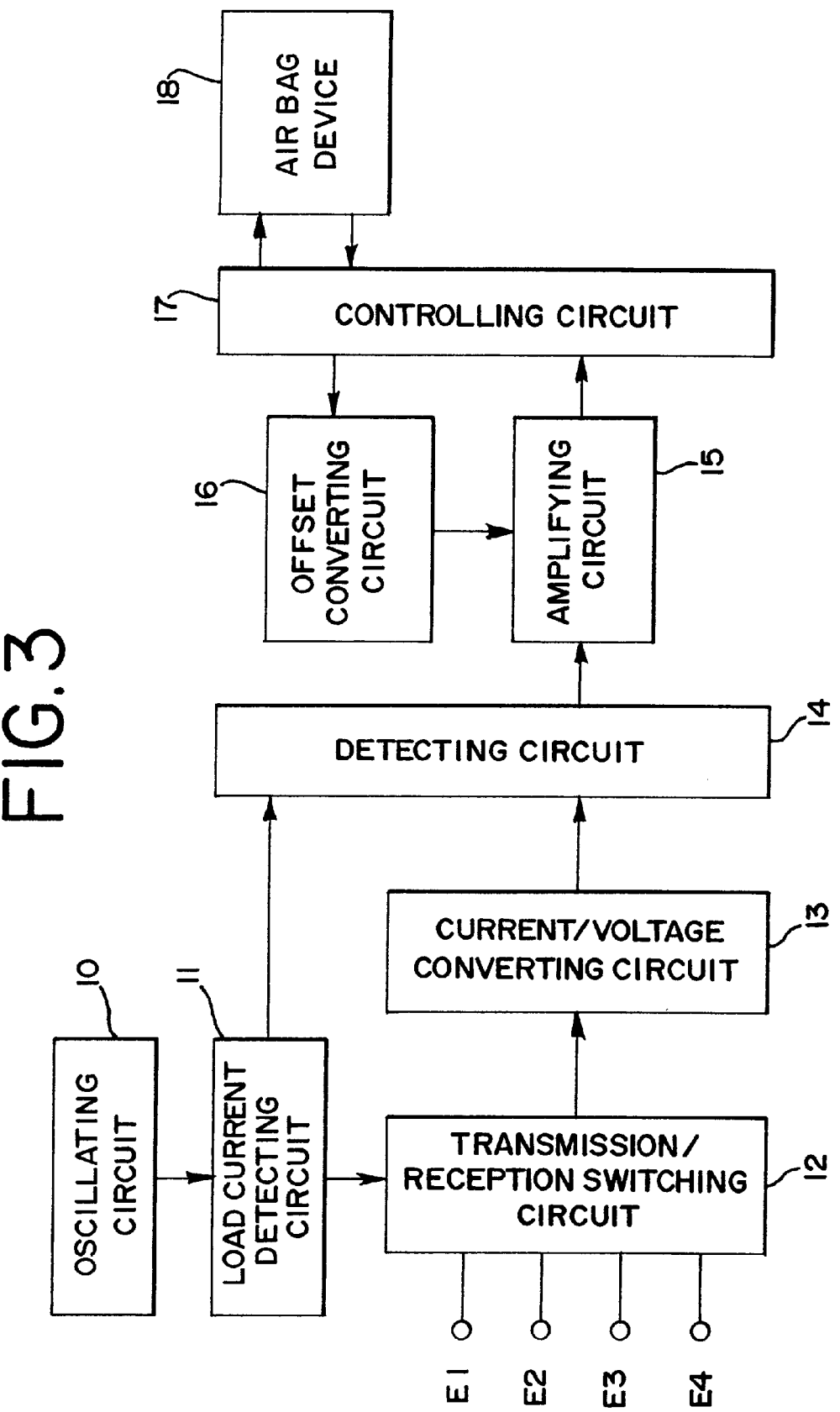
FIG. 3 is a block diagram showing one embodiment of a passenger detection system.

The system 400 may be implemented with various circuits and/or methods. Some exemplary circuits and methods are discussed below. FIG. 3 shows one embodiment of the circuit for implementing the system 400. An oscillator 10 generates an alternating, such as about a 100–120 kHz frequency, signal in the range of 5 to 12 volts (e.g. 7 volts) or at another voltage.

The load current of the alternating signal is detected by the load current detection circuit 11. Preferably, the load current detection circuit 11 comprises a demodulation circuit with a band pass filter to eliminate noise and an AC-to-DC converter that converts the voltage signals to DC signals.

The analog signal is also passed through the load current detection circuit 11 to a send/receive switching circuit 12. The send/receive switching circuit 12 comprises a multiplexer, switches or other devices to selectively connect one of the electrodes E1 through E4 to the oscillator 10 to emit the electric field, and may connect the remaining electrodes to a current-to-voltage conversion circuit 13. The current-to-voltage conversion circuit 13 comprises a resistor network and generates voltage signals indicative of the detected currents. The current-to-voltage circuit 13 also amplifies the voltage signals and transmits them to a detection circuit 14.

The detection circuit 14, such as a demodulation circuit, includes a band pass filter to eliminate noise, and an AC-to-DC converter that converts the voltage signals to DC signals. The DC signals from the detection circuit 14 are transmitted through an amplification circuit 15, which is controlled by an offset conversion circuit 16, to a control circuit 17.

The control circuit 17 comprises an ASIC, processor, digital signal processor or other digital device for generating safety restraint system (SRS) control signals. For example, a PD78052CG(A) microprocessor manufactured by NEC Corporation of Japan is used and includes the AC-to-DC portion of the detection circuit 14. The control signals are used to control other devices in the vehicle, such as an air bag control system 18. The air bag control system 18 controls the deployment of a passenger side air bag device in accordance with the SRS control signals, and also in accordance with acceleration sensor signals.

Figure 4:
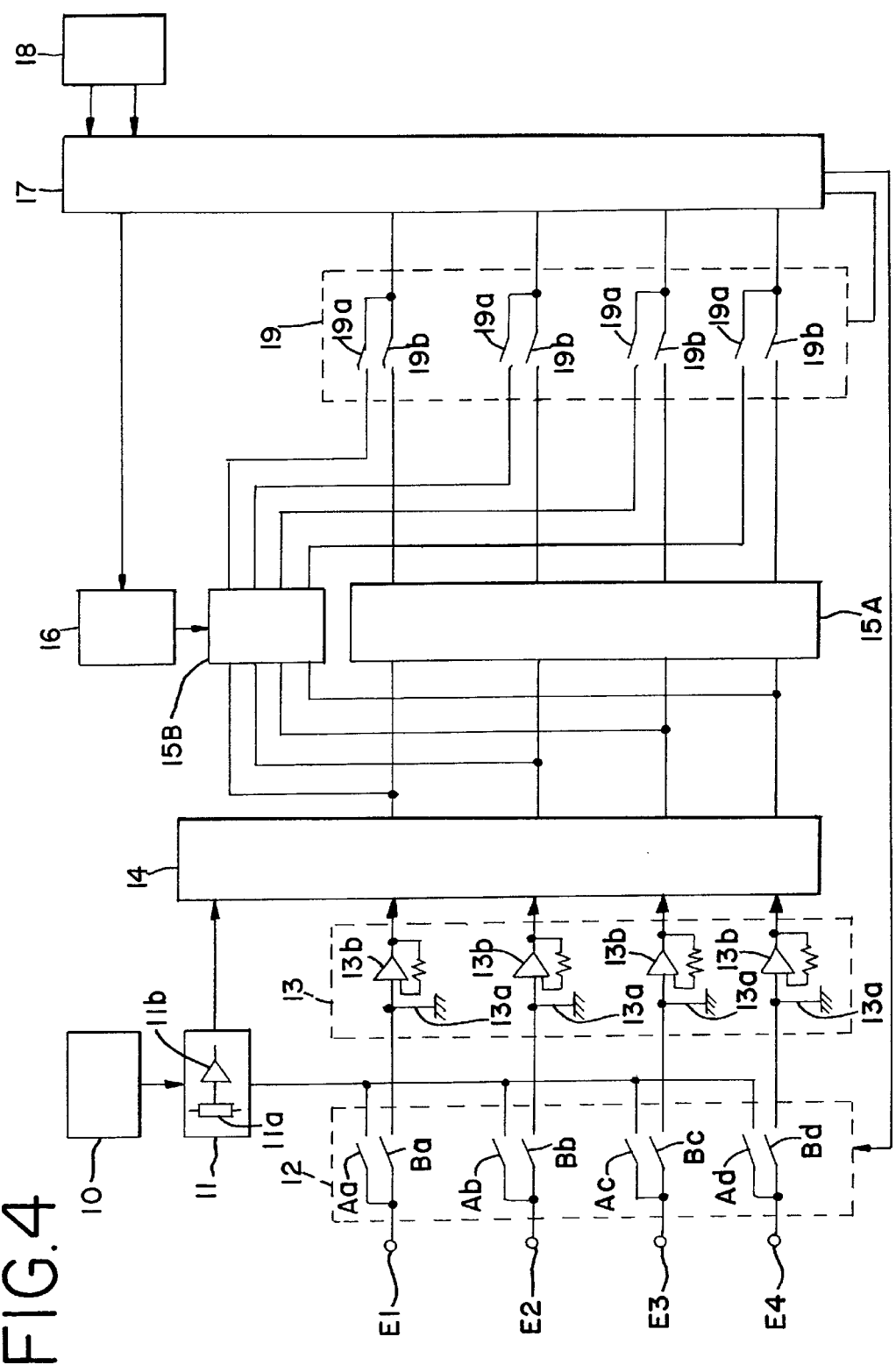
FIG. 4 is a simplified circuit diagram showing the passenger detection system of FIG. 3.

FIG. 4 is a circuit diagram showing the passenger detection circuit in additional detail. The circuit shown in FIG. 4 differs slightly from the block diagram of FIG. 3. First, the amplification circuit 15 is separated into a first amplification portion 15A and a second amplification portion 15B. Second, an analog switching circuit 19 selectively connects the signals from one of the amplification portions 15A and 15B to the control circuit 17. The control circuit 17 controls the analog selection circuit 19 to selectively switch between low amplification gain (e.g., 1×) provided by the amplification portion 15A, and high amplification gain (e.g., 100×) provided by the amplification portion 15B.

Referring to FIG. 4, the passenger detection circuit includes the oscillator 10 and the load current detection circuit 11. The load current detection circuit 11 includes an impedance/resistance element 11a connected between the oscillation circuit 10 and the send/receive switching circuit 12. A voltage signal indicating the amount of current transmitted to the send/receive switching circuit 12 is amplified by an amplifier 11b and transmitted to the detection circuit 14. The send/receive switching circuit 12 is composed of switching elements Aa through Ad and switching elements Ba through Bd. Switching elements Aa through Ad are used to selectively connect one electrode (the transmitter electrode) from among the electrodes E1 through E4 to the output of the oscillation circuit 10 in response to a first control signal received from the control circuit 17. Switching elements Ba through Bd are used to connect the other electrodes (called the receiver electrodes) to the current-to-voltage conversion circuit 13 in response to a second control signal from the control circuit 17. In one embodiment, the send/receive switching circuit 12 is a multiplexer circuit. The current-to-voltage conversion circuit 13 includes an impedance/resistance element 13a that converts the differential potential currents flowing in the receiver electrodes to voltage signals, and an amplifier 13b that amplifies the converted voltage signals.

The detection circuit 14 receives the output signal from the load current detection circuit 11 and the converted voltage signals from the receiver electrodes, and transmits DC signals representing these signals to both of the amplification portions 15A and 15B. The amplified output signals from the amplification portions 15A and 15B are transmitted to the analog selection circuit 19. The analog selection circuit 19 is composed of four switching elements 19a that are connected to receive the output from the second amplification circuit 15B, and switching elements 19a that are connected to receive the output from the first amplification circuit 15A. The analog selection circuit 19 transmits the output signals from one of the amplification circuits 15A and 15B through the switching elements 19a or 19b in response to a control signal received from the control circuit 17.

The system described above functions as follows. The switching element Aa of the send/receive switching circuit 12 is connected to the output of the oscillation circuit 10, based on the control signal from the control circuit 17. When the switching elements Bb through Bd are connected to the voltage-current switching circuit 13, the differential potential current flows to the receiver electrodes E2 through E4. These currents are converted to voltage by the impedance/resistance element 13a, amplified by the amplifier 13b, and then output to the detection circuit 14. The load current flowing to the send electrode E1 is detected by the load current detection circuit 11, and is output by the detection circuit 14 as the data R (1.1). In the detection circuit 14, undesirable noise is reduced or eliminated, and the 120 kHz received signal is bandpass filtered. The resulting voltage signal is output to the first and second amplification circuits 15A and 15B.

The output signals from the first and second amplification circuits 15A and 15B are selected as appropriate by the operation of offset conversion circuit 16 and the analog selection circuit 19, and then output to the control circuit 17. For instance, when the output signal from the detection circuit 14 is strong, the switching elements 19b of the analog selection circuit 19 are selected to connect the output from the first (low) amplification circuit 15A to the control circuit 17. If the output signal is weak and measurement of minute changes in the received signal is difficult, the switching elements 19a of the analog selection circuit 19 are selected to connect the output from the second (high) amplification circuit 15B to the control circuit 17. The control circuit 17 stores the output signals from the first or second amplification circuits 15A and 15B.

Next, the switching element Aa of the send/receive switching circuit 12 is disconnected, and the switching element Ab is connected to the oscillation circuit 10, based on the signal from the control circuit 17. Electrode E2 emits an electric field that generates currents in the receiver electrodes E1, E3 and E4. In addition, the switching elements Ba, Bc, and Bd are connected to the current/voltage conversion circuit 13 through switches Ba, Bc and Bd, respectively. The currents generated on receiver electrodes E1, E3 and E4 are converted to voltage signals and are output to the detection circuit 14. Note that the load current flowing to the send electrode E2 is detected by the load current detection circuit 11, and is output to the detection circuit 14 as the data R(2.2) in the manner described above.

Next, the switching element Ac is connected to the output of the oscillation circuit 10. This applies a high-frequency, low-voltage signal to the transmitter electrode E3 from the oscillation circuit 10, which generates currents in receiver electrodes E1, E2 and E4. The generated currents are transmitted through the switching elements Ba, Bb and Bd to the current/voltage conversion circuit 13. The load current flowing to the transmitter electrode E3 is detected by the load current detection circuit 11, and is output to the detection circuit 14 as the data R(3.3) in the manner described above.

Next, the switching element Ad is connected to the output of the oscillation circuit 10. This applies a high-frequency, low-voltage signal to the transmitter electrode E4 from the oscillation circuit 10, which generates currents in receiver electrodes E1, E2 and E3. The generated currents are transmitted through the switching elements Ba, Bb, and Bc to the current/voltage conversion circuit 13. The load current flowing to the transmitter electrode E4 is detected by the load current detection circuit 11, and is output to the detection circuit 14 as the data R(4.4) as described above.

The object on seat 1 is identified based on mathematical processing of the data transmitted to the control circuit 17 and the known spacing relationship of the electrodes E1–E4. In particular, the seating arrangements of an adult seated normally, an infant in a RFIS or a child in a FFCS are identified by comparing stored data with the data associated with the selected transmitter electrode/receiver electrode combinations of the electrodes E1 through E4. Based on this comparison, the applicable seating arrangement is identified and used to control the passenger-side air bag device.

The control circuit 17 stores data associated with the various seating patterns. Specifically, representative data is stored for an empty seat, for a child seated in a FFCS, for an infant in a RFIS, a child or small adult in one or more different positions and a large adult. This data, indicated by the general formula R (i,j), is obtained experimentally based on various combinations of the transmitter electrode and/or the receiver electrodes. Note that with the general formula R(i,j), i refers to transmitter electrode, and j refers to receiver electrode. In the control circuit 17, mathematical processing is performed using the sixteen data measurements, and the characteristics of the seating pattern are extracted. When the seating pattern is detected and identified in the control circuit 17, an appropriate control signal is sent to the air bag control system 18. For instance, if the seating pattern is empty, FFCS, or RFIS, a control signal sets the air bag device to not deploy, even in the event of a collision. For other patterns, a signal is sent enabling the air bag device to deploy.

In accordance with a second embodiment of the present invention, a passenger detection system is provided that detects the presence of a passenger based on the disruption of a minute electric field emitted in the area of a single antenna electrode or a plurality of electrodes independently operated as single antenna electrodes. Specifically, an oscillation circuit generates an alternating current (AC) signal having a known voltage amplitude and frequency that is transmitted to an antenna electrode through an impedance/resistance element. The AC signal causes the electrode to emit the minute electric field in the passenger area adjacent to the seat. The electrical characteristics of an object seated or placed on the seat (i.e., in the vicinity of the antenna electrode) disrupt the electric field. This electric field disruption alters the amount of current flowing in the antenna electrode and causes the phase of the AC signal generated on the antenna electrode to differ from the original AC signal generated by the oscillation circuit.

In this embodiment, the current detection circuit 14 preferably includes an impedance or resistance element and a differential amplifier (or other amplifier) whose output is transmitted to the control circuit 17 through the AC-to-DC conversion circuit 13 and the amplifier 15. One such impedance/resistance element is a RR1220P-103-D, manufactured by Susumukougyou of Japan, that is connected between the output of an amplification control circuit and the antenna electrode E. The differential amplifier is connected across the impedance/resistance element and generates the current signal based on the voltage differential across the impedance/resistance element. In particular, the current differential amplifier compares the voltage level of the oscillation circuit output signal with the voltage level generated on the antenna electrode, and generates the current signal that indicates the difference.

Note that the detection current of the current detection circuit 14 increases when a person is seated in the seat 1B. It decreases when luggage is in the seat, or when the seat is empty. In either case, there is a difference in the detected current level between these occupied and unoccupied conditions. The same is true for the phase differential.

The current and/or the phase differential are compared with stored values to accurately identify whether or not an adult passenger is seated in the front passenger seat. This determination is transmitted to a safety restraint device, such as an air bag control circuit, thereby controlling deployment of an air bag when an appropriately sized adult is seated in the seat.

Figure 5:
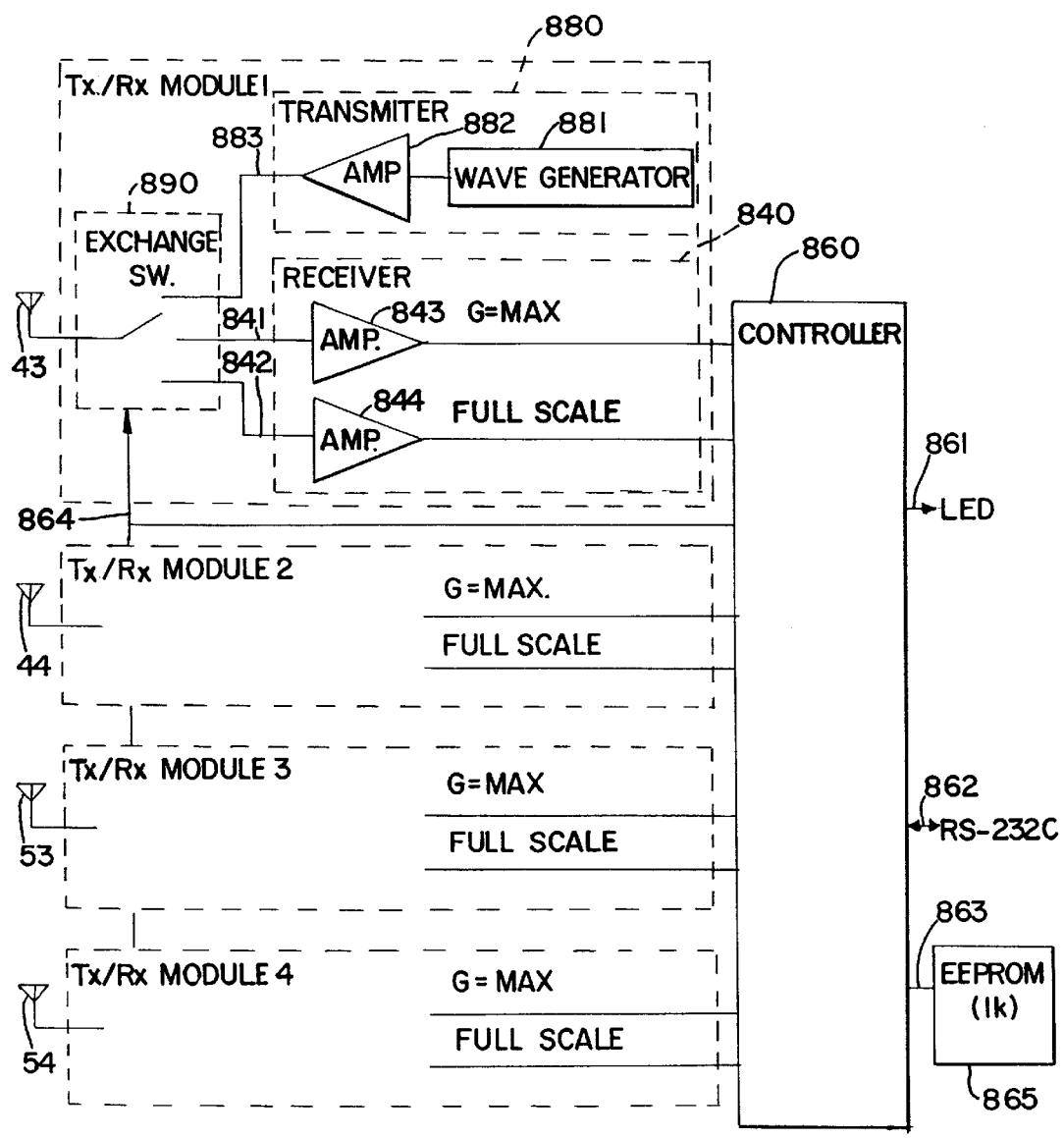
FIG. 5 is a block diagram of a preferred embodiment of a passenger detection system.

A third embodiment of the system 400 of FIG. 9 that uses the electrodes at two different distances from a passenger seating area is shown in FIG. 5. Each electrode 43, 44, 53 and 54 is connected to TX/RX modules 1 through 4. Different or the same modules may be used for each electrode. In one preferred alternative embodiment for measuring loading currents, a single TX/RX module is switchably connectable to each of the electrodes.

The TX/RX module includes a transmitter circuit 880, a receiver circuit 840 and a switch 890. The transmitter circuit 880 preferably comprises a wave generator 881 connected through an amplifier 882 to the switch 890.

The receiver circuit 840 preferably comprises two paths 841 and 842 each including respective amplifiers 843 and 844. One amplifier 843 amplifies the signal using a maximum or other gain for sensitivity to small objects. The other amplifier 844 amplifies the signal using a different gain optimized to provide a zero value when no current is detected and a 255 value when a maximum current is received. A buffer may also be provided to minimize the loading from one stage and to provide sufficient signal strength for another stage. In alternative embodiments, one amplification path is provided, or a variable amplification amplifier in one path is provided.

The switch 890, such as a multiplexer, is controlled to connect with the transmitter circuit 880, one of the paths of the receiver circuit 840 or both the transmitter circuit 880 and one of the paths of the receiver circuit 840. In the embodiment for measuring loading currents, the switch 890 is operative to sequentially connect each electrode to both the transmitter circuit 880 and the receiver circuit 840.

The controller 860 preferably includes an analog-to-digital converter and logic for processing the received data. Separate analog-to-digital converters and logic may be used. The controller 860 preferably controls the switch 890 to sequentially connect each electrode to the transmit and receive circuits 880 and 840. Thus, the controller 860 receives a set of reception and/or loading currents from each module. Based on the resulting digital values, such as 8 bit values, representing the received currents, the controller 860 determines the size, shape, position or other characteristic of a passenger. The characteristic is determined as a function of a mathematical algorithm or a comparison. For example, using EEPROM 865, RAM or another memory device, the digital values are compared to thresholds or data representing the characteristic.

The controller 860 outputs the control signals as a function of the characteristic. An LED 861 may be provided to indicate the status of the control signals, such as air-bag system enabled or disabled.

Figure 10:
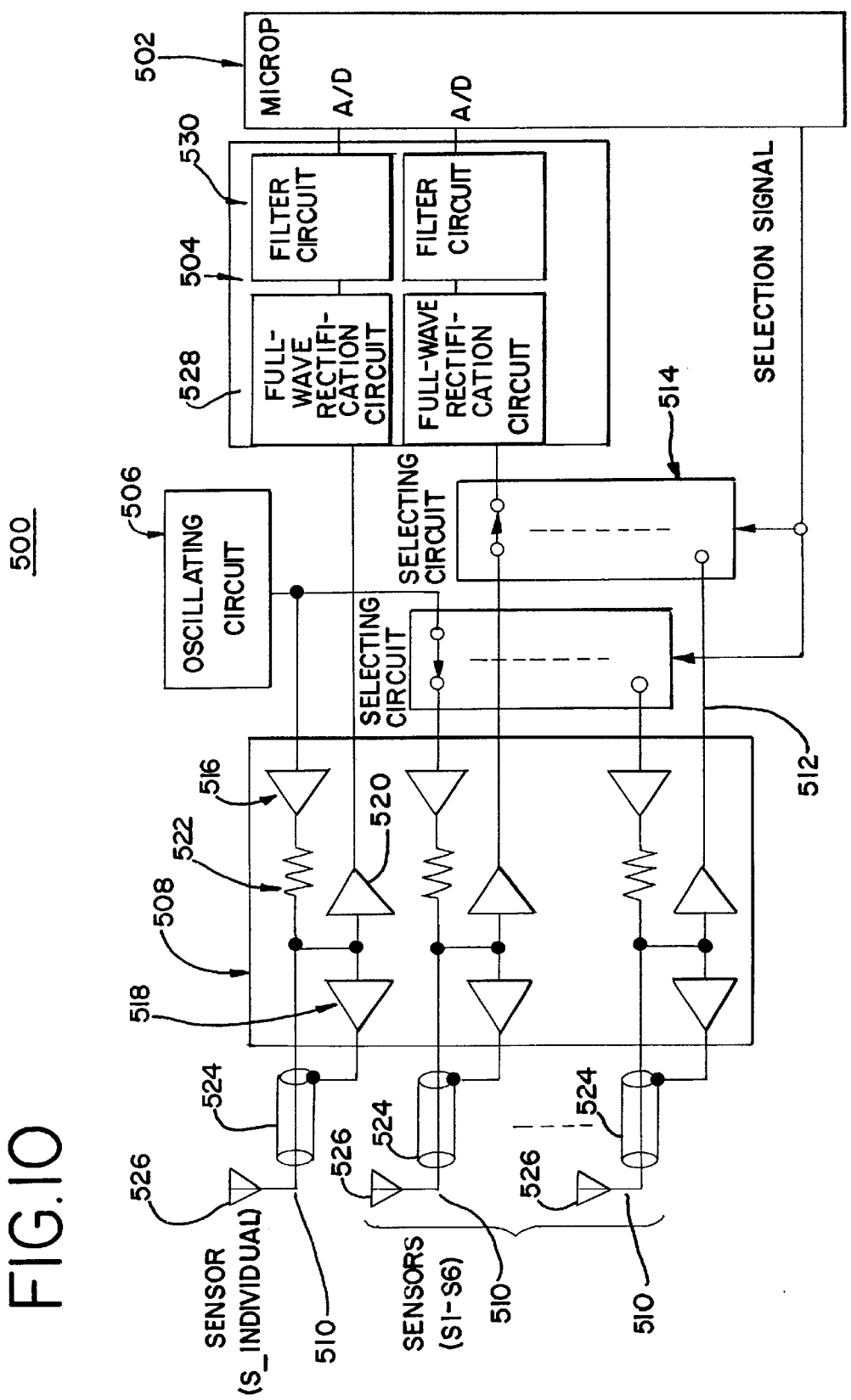
FIG. 10 is a block diagram showing yet another embodiment of a passenger detection system.

A fourth preferred embodiment of the system 400 of FIG. 9 that uses the electrodes at two different distances from a passenger seating area is shown in FIG. 10. This embodiment is similar to the system of FIG. 5 for detecting loading currents with a different switching structure. In particular, a system 500 includes a microprocessor 502, a detector 504, a oscillating circuit 506, signal conditioners 508, sensors 510 and selecting circuits 512 and 514.

Two or more paths for generating and detecting the load current are provided. One such path is described below. The other paths comprise the same or different components. In the path, the oscillating circuit 506 comprises an oscillator that generates an AC signal, such as a 120 kHz signal.

The signal conditioners 508 comprise operational amplifiers 516, 518 and 520 and a resistor 522. The operational amplifier 516 connected with the oscillating circuit 506 buffers the signal to provide a constant voltage source. The signal is provided through a shielded cable 524 to an electrode 526 of the sensor 510. An electric field is generated in response to signal. When a load to the sensor 510 increases, the voltage across the resistor 522 increases. The amount of change in the voltage is buffered by the operational amplifier 518 connected with the shield of the shielded cable 524. This operational amplifier 518 preferable has a high input impedance and low output impedance to maintain the voltage level of the shield at the same level as center conductor, shielding the sensor 510 from adjacent conductive materials.

The operational amplifier 520 connected with the detector 504 provides current gain to the loading current. The detector 504 comprises a full-wave rectification circuit 528 and a filter circuit 530. The amplitude or change in amplitude of the loading current is detected by rectifying the output of the operational amplifier 520. The rectified signal is filtered by the filter circuit 530, such as an analog low pass filter. The microprocessor 502 converts the signal to a digital signal and classifies the load.

Two possible embodiments are shown in FIG. 10 for the paths of two or more sensors 510. In one embodiment, each path includes separate components except for the microprocessor 502 (as represented by the path labeled S-individual sensor). In an alternative embodiment, each path also shares the oscillating circuit 506 and the detector 504. Alternatively, a combination of shared paths and individual paths, as shown, is used. circuits Preferably, shared paths are used. The individual path is removed. The selecting circuits 512 and 514 comprise multiplexors or a shared multiplexor controlled by the microprocessor 502. One selecting circuit connects the oscillating circuit 506 to each sensor path and the other selecting circuit connects the detector 504 to each sensor path. For classification with loading currents, one selecting circuit that connects both the oscillating circuit 506 and the detector 504 to the same path may be used. For classification with receive currents or combinations of both receive and loading currents, the selecting circuits 514 and 512 operate independently.

The microprocessor 502 measures the loading and/or receive currents to classify any occupant. Small loading current amplitudes indicate the presence of a load. The amplitude and/or change in amplitude represent changes in the impedance of the load. The load impedance varies as a function of the effective surface of the load (size) and the distance between the load and the electrode 526.

Figure 6:
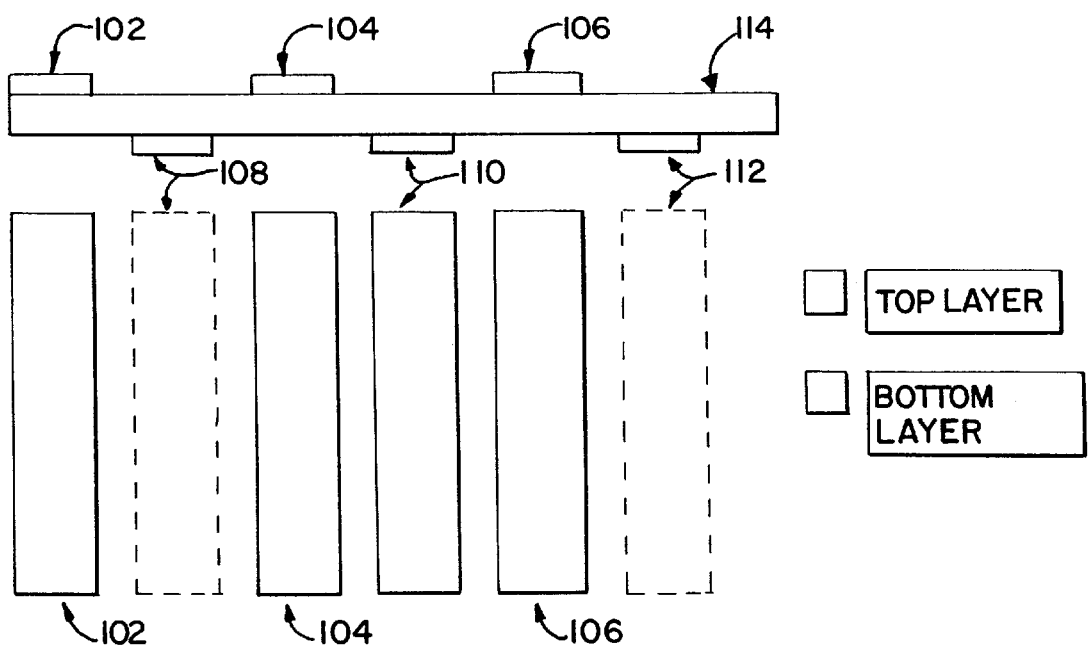
FIG. 6 is top and side views of one preferred arrangement of electrodes.

Using any of the systems described above or other circuitry, a load is characterized as a function of the array of electrodes. FIG. 6 shows one preferred embodiment of an arrangement 100 of electrodes. A plurality of electrodes 102, 104, 106, 108, 110 and 112 are arranged in two layers. The layers are separated by an insulator 114. Preferably, the insulator 114 comprises a seat cushion (e.g. 3/8 inch thick polyethylene foam), a rigid body, air or other devices which are permeable to electromagnetic energy. In this embodiment, the electrodes 102, 104, 106, 108, 110, and 112 are connected with a base portion of the seat, such as centered in the base portion and aligned in an array from the front to the back of the seat. Other arrangements positioned in other locations may be used.

The shape created by the electrodes in each layer may be different. For example, different shaped electrodes are used for each layer. Each layer is preferably in one plane, but may be arranged in a non-planar arrangement. For non-planar arrangements, a phantom layer of electrodes is created as a function of the electrodes used to make a measurement.

The arrangement 100 is connected with the seat by being within the seat, adjacent to the outer surface of the seat or at the outer surface of the seat. The arrangement 100 is thus adjacent to the passenger seating area. The two or more layers are different distances from the outer surface of the seat (i.e. different distances from the passenger seating area).

In one preferred embodiment, the loading currents from a plurality of electrodes are measured using one of the systems described above or another system. For example, loading currents are measured sequentially from each electrode using the system of FIG. 10. In this example, while the loading current of one electrode is measured, the other electrodes are grounded. Alternatively, one or more of the other electrodes are electrically isolated (not connected to ground).

The loading currents are used to determine the height, position, size, orientation, movement and/or other characteristic of a passenger. Other characteristics may be determined, such as disclosed in U.S. Pat. No. 5,914,610, the disclosure of which is herein incorporated by reference. For example, the change in distance R as a function of time shows movement.

Figure 11:
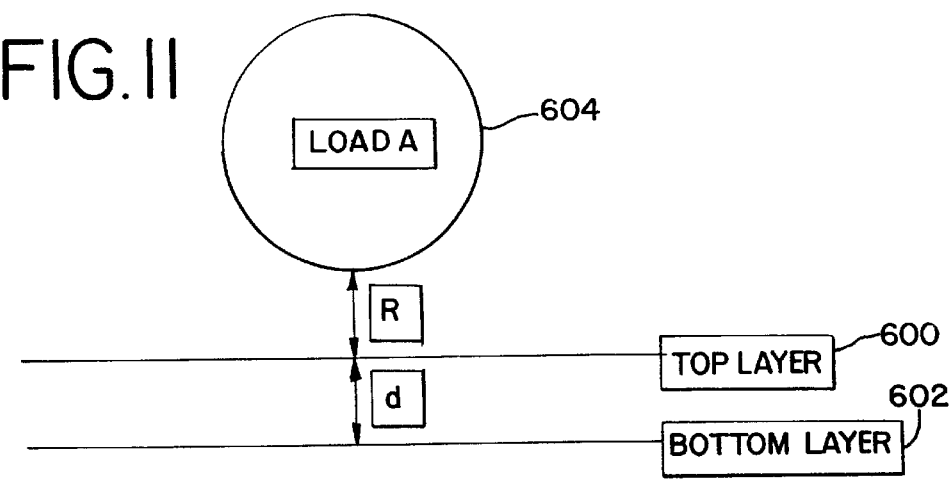
FIG. 11 is a graphical representation of electrode layers positioning relative to a load.

FIG. 11 represents the use of two layers 600 and 602 to determine the size A and distance R of a load 604. For example, the load 604 comprises an occupant adjacent to a seat in a passenger seating area. The load 604 is a distance R away from the top layer 600 of electrodes. The top and bottom layers 600 and 602 are separated by a distance d.

With two electrodes separated from the outer surface of the seat by the distance, d, the load A and distance R is determined. The loading current S, load A and distance R are related as represented by S=K(A/R), where K is a constant. Using at least two different loading current measurements, one for the electrode closest to the passenger (e.g. the top electrode)(St) and one for the electrode furthest from the passenger (e.g. the bottom electrode)(Sb), the load and distance are determined as a function of the distance between the electrodes d. Thus, the characteristic of the occupant is determined as a function of the difference in distances between the electrodes from the outer surface of the seat. St=K1(A/R) and Sb=K2(A/(R+d)). Solving for A and R, A=(d*Sb*St)/(St−Sb) and R=(d*Sb)/(St−Sb). Thus, the size of the load and distance from the electrodes is determined. In alternative embodiments, the A and R are solved without the scaling distance d and/or as a function of currents received at non-transmitting electrodes.

Preferably, more than two electrodes are used, such as the six electrodes shown in FIG. 6. With an array of electrodes, the distribution of a load is determinable. For example, the load A and distance R is determined using different pairs of electrodes, providing loads and distances adjacent various locations of the array. Using the six electrodes, three different loads and distances are determined. A greater number of electrodes in the array provide for greater spatial resolution. At any given time, electrodes not being used to measure current are grounded or electronically isolated.

In one embodiment, the insulator 114 is soft or semi-rigid, allowing for the distance between electrode layers to vary predictably. For example, the electrodes are positioned on different sides of a cushion or foam insulator. As a result, the distance between the layers varies as a function of the load as represented by d=f(A). The distance varies as a function of the weight of the passenger. In one embodiment, d=c−kA where c and k are constants determined, at least in part, as a function of the compressibility of the insulator and/or experimentation. Alternative representations of the distance d may be used, such as d=c−(k1)A−(k2)A², where c, k1 and k2 are constants. Using the equations discussed above, the load and distance from the arrangement 100 is determined as a function of the distance between the electrodes. This may allow for more accurate determination of the load by accounting for the load impact on the system.

Based on the determined load and distance information, the load is characterized. For example, the load is classified as (1) an adult in one or more positions, (2) a child or small adult in one or more positions, (3) a child in a FFCS, (4) an infant in an RFCS, or (5) another object. The classification is preferably determined by comparison to expected measurements. Alternatively, an algorithm that locates a neck of a passenger by determining the distribution of the load is used to classify the occupant as large enough for air bag activation or to small for air bag activation.

Figure 7:
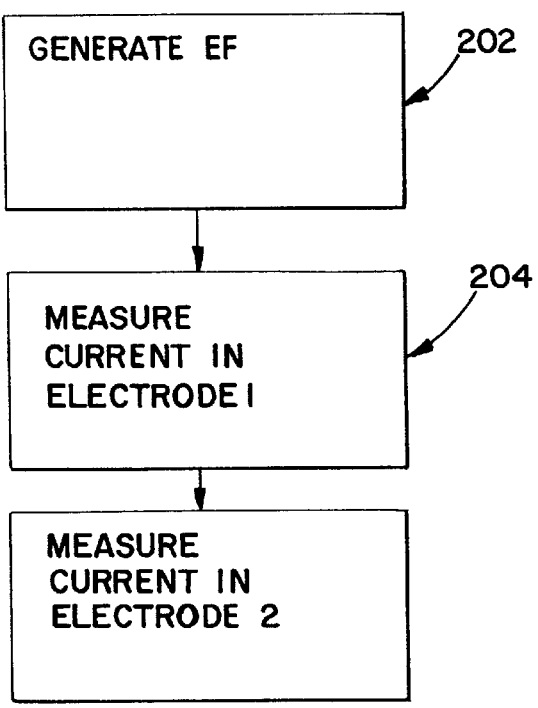
FIG. 7 is a flow chart representing one preferred method of detecting a passenger.

FIG. 7 shows a flow chart of one preferred embodiment for sensing a characteristic of a passenger with one of the systems described above or another system. This process is repeated in real-time. In act 202, an electric field is generated. For example, an AC signal is provided to one of at least two electrodes at different distances from an outer surface of a vehicle seat. In act 204, the signal at one of the at least two electrodes is measured. For example, the loading current or a received current is detected and converted to a voltage. In act 205, the signal at the other of the at least two electrodes is measured. For example, the loading current or a received current is detected and converted to a voltage. The measurement at each electrode may be sequential loading current measurements or sequential receive current measurements. Alternatively, a loading current is measured at one electrode and a receive current is measured at the other electrode either simultaneously or sequentially.

Figure 8:
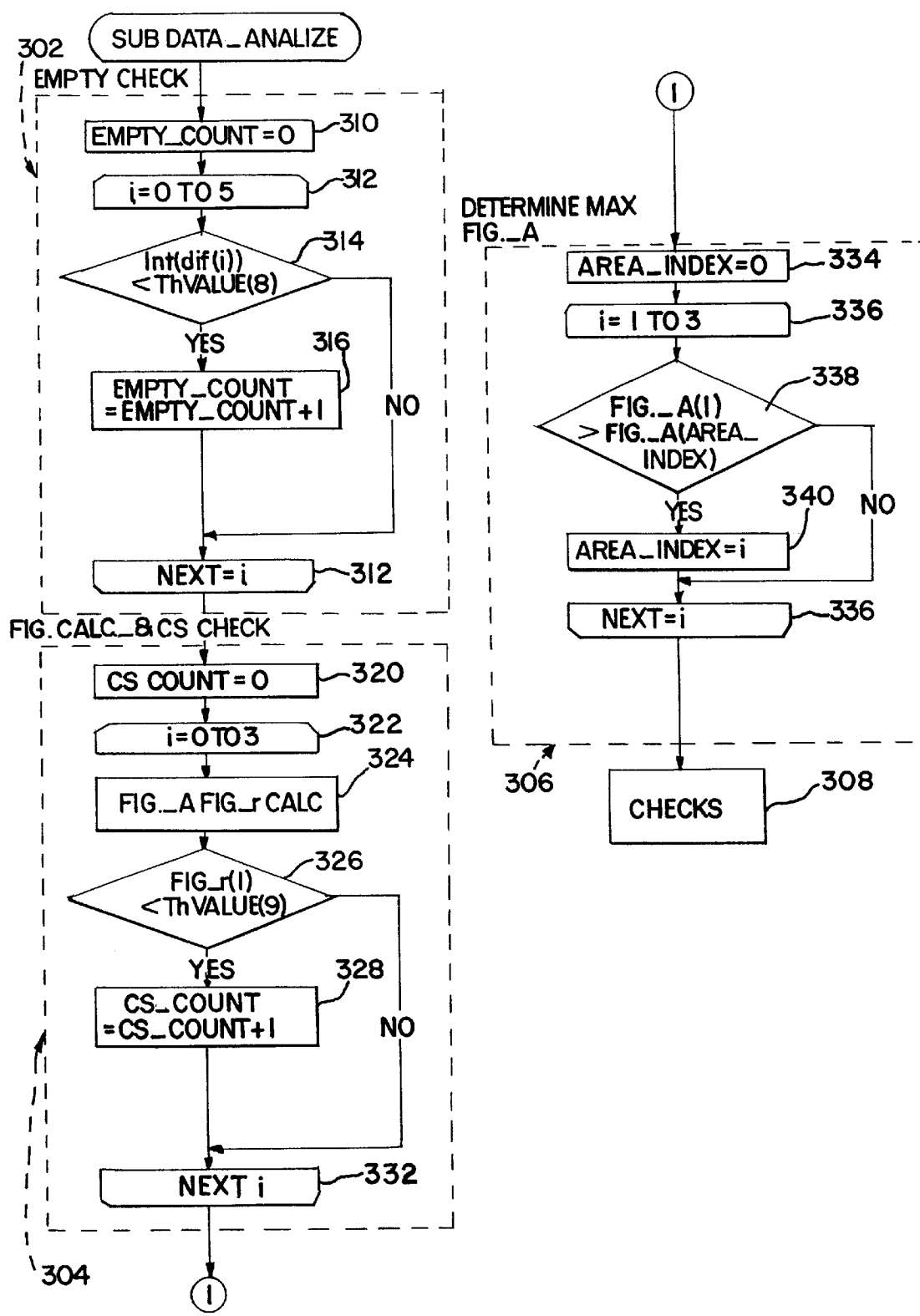
FIG. 8 is a flow chart representing one preferred method for classifying a passenger.

The measured signals are used to classify a characteristic of a passenger. FIG. 8 is a flow chart of one preferred embodiment for using measured signals to enable or disable an air bag system or to provide control signals as a function of the classification. The flow chart is optimized to operate with the electrode arrangement 100 of FIG. 6 positioned in a base portion of the vehicle seat.

The system determines whether the seat is empty in process 302. In process 304, the system determines whether the seat is occupied by a child seat. In process 306, the system determines whether the seat is occupied by an adult or a child. In process 308, the system performs various cross-checks or further processes to increase reliability for the classification. The processes may be performed in any order or combined, such as performing one or more cross-checks of process 308 as part of one or more other processes 302, 304, and/or 306. Some processes may be skipped in response to the determination made in another processes, such as skipping all other determination after a classification of the seat as empty. Different processes, algorithms, or calculations for classification may be used.

In process 302 for determining whether the seat is empty, the system initializes a count to 0 in act 310. Acts 314 and 316 are repeated for each of the six electrodes (i) as represented by the loop 312. In act 314, the value for each loading current is compared to an empty threshold. If the loading current is above the threshold, the process 302 increments to the next electrode in act 312. If the loading current is below the threshold, an empty count variable is increased by one. Thus, the process 302 provides a count of the number of loading current values at any given time that are lower than the empty threshold. In one embodiment, if any of the loading current values are above the threshold, then the seat is classified as occupied.

In one embodiment for process 302 and/or another processes, the loading currents from two or more electrodes are averaged to represent a phantom electrode loading current. For example in the case of the paired design shown in FIG. 6, four phantom loading currents, two for each layer, are determined by averaging different groupings of electrode loading currents. Labeling the electrodes 102, 104, 106, 108, 110, and 112 as electrodes S1, S2, S3, S4, S5 and S6 (where S1, S3 and S5 comprise a first layer and S2, S4 and S6 comprise a second layer), the four phantom loading currents are calculated as follows:

$$S_{avg}1=(S1+S3)/2$$

$$S_{avg}2=(S2+S4)/2$$

$$S_{avg}3=(S3+S5)/2$$

$$S_{avg}4=(S4+S6)/2$$

In the process 304 for determining whether the seat is occupied by a child seat, the system initializes a child seat count to zero in act 320. Acts 322, 324, 326, and 328 are repeated for each of four sections (i) as represented by the loop 322. The four sections correspond to four unique combinations of at least two electrodes and associated loading current measurements. For example, the four sections comprise loading currents from four combinations of electrodes: (1) electrodes 1, 2 and 3, (2) electrodes 2, 3 and 4, (3) electrodes 3, 4 and 5, and (4) electrodes 4, 5 and 6. Other combinations may be used.

In act 324, the load A and the distance R are determined from the loading currents in a first section. The calculations are determined as discussed above. In one embodiment, the load A calculations are determined as follows:

$$A0=(S_{avg}1*S2)/(S_{avg}1-S2)*(S2)^{-y};$$

$$A1=(S3*S_{avg}2)/(S3-S_{avg}2)*(S_{avg}2)^{-y};$$

$$A2=(S_{avg}3*S4)/(S_{avg}3-S4)*(S4)^{-y};$$

and $$A3=(S5*S_{avg}4)/(S5-S_{avg}4)*(S_{avg}4)^{-y},$$

where a correction factor $(Sb)^{-y}$ is used. Based on experimentation, one preferred value is y=0.4. If any load A is less than or equal to 0, the value is assigned as −1. R is calculated as follows:

$$R0=A0/S_{avg}1;$$

$$R1=A1/S3;$$

$$R2=A2/S_{avg}3;$$

and $$R3=A3/S5,$$

Where any distance R value is assigned as 99999 if the corresponding A value is equal to −1.

Preferably, the distance between the layers of electrodes varies as a function of the load. In act 326, the distance R from the electrodes to the load is compared to a child seat threshold. If the distance R is above the threshold, the process 304 increments to the next section in act 322. If the distance R is below the threshold, the child seat count variable is increased by one. Thus, the process 304 counts the number of sections with a distance R at any given time that is higher than the child seat threshold. In other words, the number of sections with distance values corresponding to an object spaced from the seat is determined. In one embodiment, if three of the four sections correspond to distances R that are above the threshold, then the seat is classified as occupied by a child seat. The child seat may be further classified as a FFCS if R1<R2<R3, and as a RFIS if R0>R1>R2 or other methods.

In the process 306 for determining whether the seat is occupied by a child or an adult, the system initializes an area index to 0 in act 334. Acts 338 and 340 are repeated for each of three times for comparison of the load values A for each of the four sections as represented by the loop 336. In act 338, the load of one section is compared to the load of another section, such as comparing the load of a section defined by the loop count of act 336 with the load of a section defined by the area index. For example, the load of section 1 is compared to the load of section zero. If the load of the section defined by the loop count is less than the load defined by the area index, the process 306 increments to the next section and associated loop count in act 336. If the load of the section defined by the loop count is more than the load defined by the area index, the area index variable is set equal to the current loop count variable. Thus, the process 306 determines the maximum load value and associated section. The maximum load value is compared to a threshold to determine whether the load corresponds to an adult or a child.

In one embodiment, the load value A corresponding to the maximum distance value R is excluded for performing the process 306. This exclusion may eliminate false data caused by averaging loading currents from two adjacent electrodes in the phantom loading current embodiment discussed above.

In the process 308, one or more cheeks and/or other acts are performed to verify and/or limit the classification. For example, the numerical results of the processes 302, 304 and/or 306 are averaged as a function of time. This running average is used to classify any occupant. Alternatively or additionally, the measurements of the loading current are averaged as a function of time prior to comparison to thresholds and/or calculations.

As another example, once the characteristic is classified, the classification is locked for a time period, such as 5 seconds. As the processes 302, 304 and 306 are repeated for different sets of sequential measurements, subsequent different classifications are discarded or averaged and ignored until after a period of time. The classification provided as a control signal is not changed until after the threshold time period. Additionally or alternatively, the classification is not changed unless a certain number of consecutive or substantially consecutive classifications indicate that the characteristic has changed. In an alternative embodiment, a child, RFCS and/or FFCS classification is locked until the vehicle is turned off or an empty classification is determined.

As yet another example, overlapping thresholds are used to prioritize a type of classification. In one embodiment, thresholds are set to more easily change the classification from an adult to a child than from a child to an adult. For example, if the classification is an adult, then the maximum load threshold for classifying the occupant as a child is set higher than if the classification began as a child. Likewise, the threshold or number of sections required for a car seat classification may be different as a function of the most recent prior classification, resulting in prioritizing between an adult and/or a child and a car seat. This prioritization provides a gray zone or area between the thresholds. For example, the lower threshold may be based on the load for an average 6 year old child and the upper threshold may be based on a 5th percentile adult female. Any occupant classified within the gray zone is classified according to the priority, such as classification as a child.

In one embodiment, a check is performed to verify that an adult classification is not the result of a child standing in one spot or a grocery bag on the base portion of the seat. Since the classification as adult is based, in part, on the load at one section or area of the seat, this check verifies that the load is distributed as would be for a sitting adult. Ratios of the maximum load to the load of each adjacent section are compared to a load distribution threshold. For example, if the maximum load $A_{max}$ is the A1 load and (A1>135% of A0 or A2<120% of A3), an "IRREGULAR" classification is used. Likewise, if Amax=A2 and (A2>135% of A1 or A2>200% of A3) or if Amax=A3 and (A3>135% of A2), the condition is also judged as "IRREGULAR." Alternatively, the load for other sections, such as associated with adjacent areas are compared to the same or a lesser load threshold as the maximum load. If the distribution of the load corresponds to an adult, the classification is verified. Otherwise, the classification is changed to a child. Control signals disabling the air bag are provided in response to an irregular classification.

Other checks may be performed. If the maximum load A is the A0 load, the occupant is considered out of position or sitting at the edge of the seat. This classification is considered "IRREGULAR."

Preferably, an LED or other output device is provided to indicate the status of the control signals. For example, the LED is illuminated when the air-bag is disabled.

In one embodiment for use with typical automobile seating materials, the distance between the layers is measured. Automobile seats typically are manufactured, in part, from open-celled polyurethane foam. The foam is used as the insulator between the electrode layers. This approach may allow for improved comfort and allows easier or more convenient molding of the sensors into a seat. Other materials, such as more rigid or softer materials, may be used.

In this embodiment, compression of the insulation layer (e.g. compression of the open-celled polyurethane foam) is accounted for in the calculation of mass A and distance R. Furthermore, the compression may be used to determine a weight W of the occupant. The weight is used for characterization of the load and associated control of the air bag system.

Figure 12:
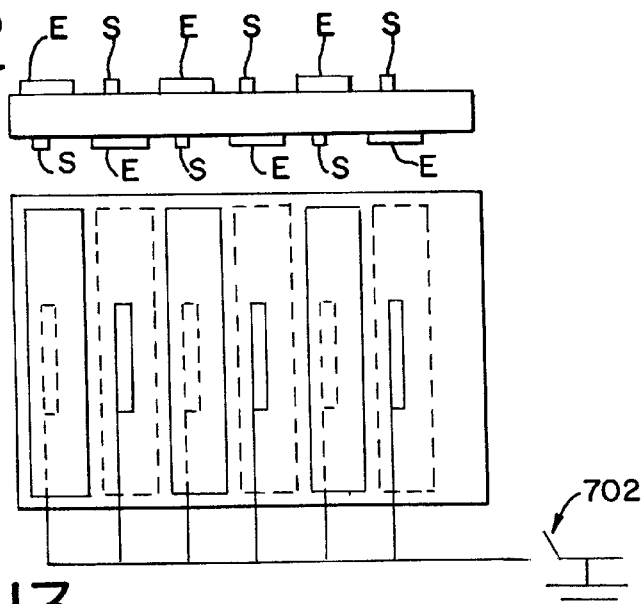
FIG. 12 is a graphical representation of one embodiment of an arrangement of electrodes.

The compression of the insulation layer is accounted for by measuring the distance d between the layers. Sensors S are added to an opposite side of the insulation layer for each electrode as shown in FIG. 12. The thickness of the electrodes is negligible compared to the thickness d of the insulator, but are shown as substantial in FIG. 12 for ease of reference. In alternative embodiments, a sensor S is added opposite to as few as one or a sub-set of all of the electrodes E. For example, the sensors S are placed opposite the top layer of electrodes, but not the bottom layer of electrodes. In alternative embodiments, other electrodes E are used instead of the added sensor S.

The sensors S comprise electrodes, such as metal foil, webbing or other materials as discussed above. Each of the sensors S are of any shape and/or size, including similar or different shapes and/or sizes as the other sensors S or electrodes E. In one embodiment, the sensors S comprise a same shape but smaller area than the respective opposite electrodes. For example, the area of each sensor S is approximately 1/10 of the area of the respective opposite electrode E. FIG. 12 shows such an arrangement. As shown, the sensors S are positioned near the center of the opposite electrodes E, but other relative positions may be used.

The arrangement of sensors S and electrodes E of this embodiment are used to measure the distance d. In a first embodiment, two measurements are taken for at least one of the electrodes E, one where the opposite sensor S is floating (i.e. not electrically connected) and the other where the opposite sensor S is grounded. In a second embodiment, the loading current or other current is measured for the sensor S where the opposite electrode E is grounded.

Referring to this first embodiment, a bottom electrode E is used as an example. The same measurements may be used for others of the electrode-sensor combinations. The float measurement is represented as:

$$B = K(A/(R+d) + Sfloat/d)$$

where B is the received or loading current of the bottom electrode E (Sb in the similar equations discussed above) and Sfloat represents the load caused by the thickness sensor S in a floating condition. Sfloat is a constant determined as a function of the relative sizes and shapes of the sensor S and opposite electrode E.

The measurement with the sensor S grounded is represented as:

$$Ba = K(A/(R+d) + Sgnd/d)$$

where Ba is the received or loading current of the bottom electrode E (Sb in the similar equations discussed above) and Sgnd represents the load caused by the thickness sensor S in a grounded condition. Sgnd is also a constant determined as a function of the relative sizes and shapes of the sensor S and the grounded connection.

The electrodes are allowed to float or grounded using the switch 702. The switch comprises a transistor, a multiplexer or other switching device, such as described above.

The equations discussed above are combined to provide:

$$Ba - B = K(Sgnd/d - Sfloat/d).$$

Sfloat is preferably small. For example, the sensor S has the smaller area as discussed above, allowing Sfloat to be factored out of the determination. The combined equation then becomes:

$$Ba - B = K(Sgnd/d) \text{ or } d = K(Sgnd/(Ba - B))$$

To calculate A and R, measurements, T and B, for top and bottom electrodes are obtained. Additional measurements using the sensors S may be used. Solving for the top and bottom electrodes E:

$$T = K(A/R) \text{ and } R = K(A/T)$$

$$B = K(A/(R+d))$$

By solving for A:

$$A = Const. * (TB/(T-B)) * (Sgnd/(Ba-B))$$

Likewise, R is solved for as discussed above using (Sgnd/(Ba−B)) for the distance d. A and R are used as discussed above to characterize any occupant and control the air bag or other system. The constant in the equation for A or R is determined through experimentation and may account for any of the factors discussed herein.

Further variables may be used, such as multiplying the equation by $B^{-y}$ to compensate for the compression where the distance d is not measured. 0.4 was chosen for y by experiment. Preferably, the distance is measured as discussed herein. In other alternative embodiments, Sfloat is assumed to be significant and used to calculate A and R.

Figure 13:
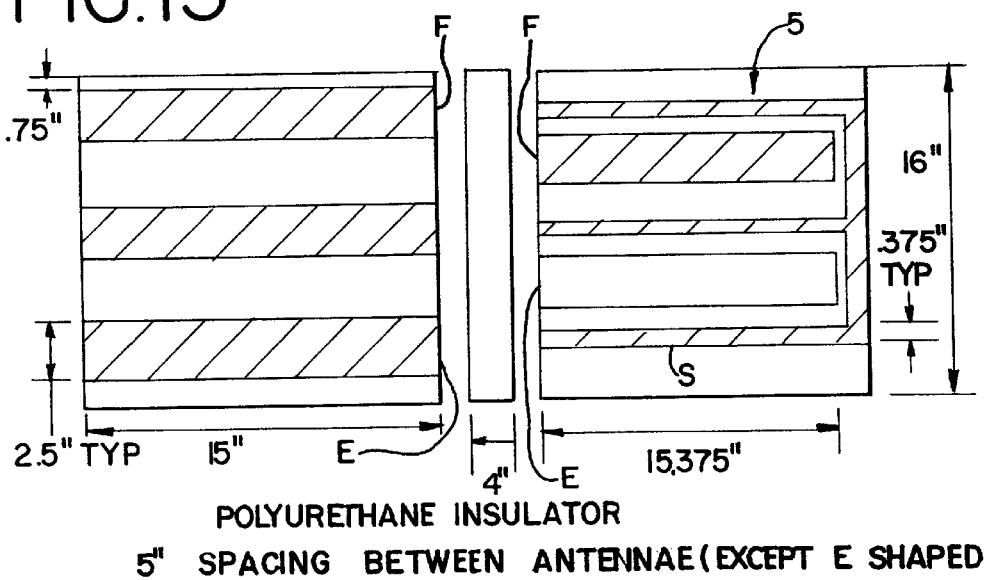
FIG. 13 is a graphical representation of another embodiment of an arrangement of electrodes.

In the second embodiment for measuring the distance d, the sensor S is connected with an oscillating signal. One embodiment of the sensor S configuration is shown in FIG. 13. Other configurations may be used, such as described above or as shown in FIG. 12. FIG. 13 shows three top electrodes E and two bottom electrodes E. Three sensors S positioned opposite the top electrodes E are electrically connected together. In alternative embodiments, the sensors S are electrically independent.

Interspersed with the electrode measurements as described above, the sensors S are used to measure the thickness d. For example, the sensors S are connected to an oscillating signal and the opposite electrodes E are connected to ground. By grounding the electrodes E, the impact of the current caused by any occupant is minimized.

The loading current is measured. The loading current of the sensors S is larger for a lesser distance d. Using experimentally determined values, the loading current is matched with a corresponding distance. The distance is used in the equations discussed above to solve for A and R.

Example software code for implementing this embodiment using an 8 bit microcomputer is attached as appendices A and B. The code comprises Visual Basic code. Within the code of Appendices A and B, dif(x) represents the difference between a no-load measurement and a load measurement where x is the channel or electrode number, and Th Value represents a value experimentally determined, such as a threshold or insulator thickness. For the system of Appendix B, the system first determines distances associated with five electrodes. The load A is calculated for each electrode as a function of the electrode measurements and the associated distance (e.g. the associated distance is used as a correction value for the electrode measurements, such as multiplying the A value by the square root of the distance). Maximum and average A values are also determined. R for each electrode is then calculated as a function of the electrode measurements and the associated A values. The weight is defined as dif(0) where channel 0 is connected to the sensors opposite three of the electrodes. Various checks are performed to further characterize the occupant, such as checking for an empty seat, a booster seat, an adult and a child. For the child and adult determinations, the electrode associated with Amax is identified and used to select possible thresholds. For example, if the occupant is sitting forward in the seat, a different set of thresholds are used than if the occupant is sitting back in the seat. These determinations are performed as part of defined sequences.

In one embodiment, the distance d is used to determine a corresponding weight of an occupant. The amount of compression represents a weight being applied by the occupant. The relationship is experimentally determined as discussed above. The distance d or a weight value determined from the distance are used to characterize the occupant. For example, a small distance d indicates a heavier occupant.

The weight is used with the A and R values to characterize the occupant and control the air bag system. For example, thresholds and logic relationships are applied to each variable (e.g. W, R and A) to determine the characteristic, such as size and position of any occupant. The weight W may indicate whether an occupant is an adult or small adult/child.

As another example, a weighted combination of two or more of these variable is used. Various combinations may be used, such as based on experimentation. For example, a weighted sum of $1/3W+1/3Amax+1/3Aavg$ is compared to a threshold to determine whether any occupant is an adult or small adult/child. R is used logically to determine whether a child booster seat is being used.

In one embodiment, the distance is determined as a function of measurements before and after a load is applied to the seat (i.e. before and after an occupant occupies the seat). For example, the capacitance between the sensors and the electrodes is assumed to be linear as a function of distance. Using the sensor arrangement of FIG. 13, the no load voltage, $V_1$, for the sensors is equal to $k*3S/d_0$, and the load voltage, $V_L$, for the sensors S is equal to $k*3S/d_L$, where $d_0$ and $d_L$ are the no load and loaded distances, respectively, S is the effective surface area of the electrodes opposite the sensor, and k is a constant. Solving for $d_L$, $d_L = d_0(V_L/V_i)$. This overall thickness of the insulator under loading conditions may be used to determine overall A, R and/or weight values.

In a further embodiment, weight distribution across the electrode array is determined, or separate A, R or d values are determined for particular sections of the seat. For example, using the sensor arrangement of FIG. 13, distances d2, d3, d4, d5 and d6 correspond to a respective five electrodes. Where $Cap_{1-2}$, $Cap_{1-4}$ and $Cap_{1-6}$ are the capacitance change associated with electrodes 2, 4 and 6, respectively, the measured channel 1 sensor voltage or associated current $CH_1$ equals $Cap_{1-2}+Cap_{1-4}+Cap_{1-6}$ since the change in capacitance is represented by current differences. $Cap_{1-2}$ equals $kS(1/d2-1/d_0)$; $Cap_{1-4}$ equals $kS(1/d4-1/d_0)$; and $Cap_{1-6}$ equals $kS(1/d6-1/d_0)$. Assuming that $Cap_{1-2}$, $Cap_{1-4}$ and $Cap_{1-6}$ equal or approximate to the voltage or current at each respective channel $CH_2$, $CH_4$, and $CH_6$ and defining a total channel voltage $CH_T$ as equal to $CH_2+CH_4+CH_6$, d2 equals $(CH_T*d_0)/(CH_T+m*CH_1*CH_2*d_0)$; d4 equals $(CH_T*d_0)/(CH_T+m*CH_1*CH_4*d_0)$; and d6 equals $(CH_T*d_0)/(CH_T+m*CH_1*CH_6*d_0)$, where m is a constant. d3 and d5 are assumed to be the average of the distances of associated with adjacent electrodes. A and R values may be determined separately for each section as well.

The separate A, R and/or d values for sections of the seat are used to characterize the load. For example, the values are used to determine which thresholds or algorithms to apply, to designate a distribution of the occupant, to calculate maximums, minimums or averages, to allow comparisons for occupant characterization, to correct other values or other uses (see Appendices A and B). The weight distribution as a function of the distance distribution may be used to further characterize the occupant.

The present invention is not limited to the embodiments provided above. For example, the frequency of the signal output from the oscillator can be other than 120 kHz, depending on the object to be detected. In addition, the voltage amplitude of the signal can be outside the range of 5 to 12 volts, and the output wave form can be a wave form other than a sine wave. The electrodes may be positioned in different locations adjacent to the passenger seating area, such as in the roof liner, on the floor, in the seat back, on the dash board and/or on the seat in front of a back seat. The system may be used to operate with one or more of many different systems, including front impact air bags, side impact airbags, seat belt controls, temperature controls and other electrical devices of a vehicle. The measurements, whether loading currents, received currents or combinations thereof, may be used with any of various algorithms to classify the passenger. The system may also be used for other applications, such as hospital beds for controlling devices dependent upon the characteristics of an occupant. More than two layers of electrodes may be used.

While various embodiments have been described herein, changes and modifications may be made without departing from the scope of the invention which is defined by the following claims and equivalents thereof.

APPENDIX A

```
Private Sub data_analyze()
Dim m As Integer
'Label color reset
    lbl_fig_A(Area_index).BackColor = &HFFFFFF
    If lbl_fig_r(Maxr_index).BackColor <> Val(sys_const(22)) Then
lbl_fig_r(Maxr_index).BackColor = &HFFFFFF
Area_index = 0
Maxr_index = 0
Irregular = False
Child = False
'empty count
    empty_count = 0
    For i = 0 To 5
        If Int(dif(i)) <ThValue(8) Then
            empty_count_empty_count + 1
            lbl_difdata(i).BackColor = Val(sysconst(20))
        Else
            lbl_difdata(i).BackColor = &HFFFFFF
        End If
    Next i
'Fig_A and Fig_r calc.with (Bottom + 1) evaluation
    fig_invalid = 0
    MinR = ThValue(3)
    CS_count = 0
    'Calculate TOP_Val And BTM_Val based on area
        TOP_VAL = (dif(1) + dif(3) + dif(5))/3
        BTM_VAL = (dif(2) + dif(4))/2
        If TOP_VAL - BTM_VAL <= 0 Then
            fig_r(0) = 0: fig_A(0) = 0
        Else: fig_r(0) = BTM_VAL/(TOP_VAL - BTM_VAL) * dif(0)
            fig_A(0) = (TOP_VAL * BTM_VAL)/(TOP_VAL - BTM_VAL) *
dif(0)/10
        End If
'Limit the maximum value
    If fig_A(0)>ThValue(2) Then fig_A(0) = ThValue(2)
    If fig_r(0) >ThValue(3) Then fig_r(0) = ThValue(3)
'Indicate Figs.
    lbl_fig_A(0).Caption = Int(fig_A(0))
    lbl_fig_r(0).Caption = Int(fig_r(0))
'prediction
If empty_count = 6 Then 'empty
    predict = 0
Else
    If fig_r(0) >ThValue(18) Then 'booster
        predict = 3
    Else
        If fig_A(0) <ThValue(31) Then 'child
            predict = 5
        Else
            predict = 6 'adult
        End If
    End If
End If
'Prediction (Time delay)
If predict <>state_pred Then
    'reset counter if changed from previous prediction
    If predict <>Last_pred Then gPred_chg.Value = timer_pred.Interval
    If gPred_chg.Value + timer_pred.Interval >= ThValue(35) Then 'change
prediction
        'Change state & indication
        state_pred = predict
        Select Case predict
            Case 0 To 4
                lbl_pred.BackColor = Val(sys_const(20 + predict))
                lbl_pred.Caption = sysconst(10 + predict)
            Case 5 To 9
                lbl_pred.BackColor = Val(sysconst(55 + predict))
                lbl_pred.Caption = sysconst(45 + predict)
        End Select
        'voice response
    If V_(sys_const(45)) = 1 Then
        Select Case predict
            Case 0 To 4
                voice sndPlaySound(ByVal CStr(filepath + sys_const(40 +
predict)), 1)
            Case 5 To 9
                voice sndPlaySound(ByVal CStr(filepath + sys_const(60 +
```

-continued

```
predict)), 1)
                End Select
            End If
            'change airbag control
            Select Case state_pred
                Case 0 To 4
                    lbl_ABctl.Caption = sys_const(25 + Val(sys_const(15 + state_pred)))
                    lbl_ABctl.BackColor = V_(sys_const(27 + Val(sys_const(15 +
state_pred))))
                Case 5 To 9
                    lbl_ABctl.Caption = sysconst(25 + Val(sys_const(50 + state_pred)))
                    lbl_ABctl.BackColor = Val(sys_const(27 + Val(sysconst(50 +
state_pred))))
            End Select
            gPred_chg.Value = timer_pred.Interval
            gpred_chg.Visible = False
            timer_pred.Enabled = False
        Else 'delay timer
            If timer_pred.Enabled = False Then timer_pred.Enabled = True
            Select Case predict
                Case 0 To 4
                    gPred_chg.ForeColor = V_(sys_const(20 + predict))
                Case 5 To 9
                    gPred_chg.ForeColor = Val(sys_const(5 5 + predict))
            End Select
            ' gPred_chg.Visible = True
        End If
    Else 'no change(timer off)
        If timer_pred.Enabled Then timer_pred.Enabled = False
        gPredchg.Visible = False
    End If
    'store this time prediction
    Last_pred = predict
End Sub
```

APPENDIX B

```
Private Sub data_analyze()
Dim m As Integer
'Label color reset
    'lbl_fig_A(Area_index).BackColor = &HFFFFFF
    'If lbl_fig_R(Maxr_index).BackColor <>Val(sys_const(22)) Then
lbl_fig_R(Maxr_index).BackColor = &HFFFFFF
Area_index = 0
Maxr_index = 0
Irregular = False
Child = False
'empty count
    empty_count = 0
    For i = 0 To 6
        If Int(dif(i)) <ThValue(8) Then
            empty_count = empty_count + 1
            lbl_difdata(i).BackColor = Val(sys_const(20))
        Else
            lbl_difdata(i).BackColor = &HFFFFFF
        End If
    Next i
'd 1~6 calculation
    cht = dif(1) + dif(3) + dif(5)
    If cht>0 Then
        d(1) = cht/(cht + (ThValue(34) * dif(6) * dif(1) * ThValue(38)))
        d(3) = cht/(cht + (ThValue(34) * dif(6) * dif(3) * ThValue(38)))
        d(5) = cht/(cht + (ThValue(34) * dif(6) * dif(5) * ThValue(38)))
        d(2) = (d(1) + d(3))/2
        d(4) = (d(3) + d(5))/2
        d(6) = d(5)
    Else
        For i = 1 To 6
        d(i) = 0
        Next i
    End If
'Fig_A and Fig_r calc. with (Bottom + 1) evaluation
    fig_invalid = 0
    MinR = ThValue(3)
    CS_count = 0
'----A Value calculations---
If dif(1) >dif(0) And dif(1) >0 Then
    fig_A(1) = (dif(1) * dif(0))/(dif(1) − dif(0))
    Else: fig_A(1) = −1
End If
```

```
-continued

If dif(1) >dif(0) And dif(1) >dif(2) And dif(1) >0 Then
    fig_A(2) = ((dif(1) * (dif(0) + dif(2))/2)/((dif(1) - (dif(0) + dif(2))/2))
    Else: fig_A(2) = -1
End If
If dif(1) >dif(2) And dif(3) >dif(2) And dif(1) + dif(3) >0 Then
    fig_A(3) = ((((dif(1) + (dif(3))/2) * dif(2))/((dif(1) + dif(3))/2) - dif(2)))
    Else: fig_A(3) = -1
End If
If dif(3) >dif(2) And dif(3) >dif(4) And dif(3) >0 Then
    fig_A(4) = (dif(3) * (dif(2) + dif(4))/2)/(dif(3) - (dif(2) + dif(4))/2)
    Else: fig_A(4) = -1
End If
If dif(3) >dif(4) And dif(5) >dif(4) And (dif(3) + dif(5)) >0 Then
    fig_A(5) = (((dif(3) + dif(5))/2) * dif(4))/(((dif(3) + dif(5))/2) - dif(4))
    Else: fig_A(5) = -1
End If
If dif(5) >dif(4) And dif(5) >0 Then
    fig_A(6) = (dif(5) * dif(4))/(dif(5) - dif(4))
    Else: fig_A(6) = -1
End If
'fig_A calculation
If fig_A(1) = -1 Or fig_A(1) >2 * fig_A(2) Or fig_A(1) <0.5 * fig_A(2) Then
    fig_A(1) = -1
Else: fig_A(1) = fig_A(1) * d(1)
End If
If fig_A(2) = -1 Then
    fig_A(2) = -1
Else: fig_A(2) = fig_A(2) * d(2)
End If
If fig_A(3) = -1 Then
    fig_A(3) = -1
Else: fig_A(3) = fig_A(3) * d(3)
End If
If fig_A(4) = -1 Then
    fig_A(4) = -1
Else: fig_A(4) = fig_A(4) * d(4)
End If
If fig_A(5) = -1 Then
    fig_A(5) = -1
Else: fig_A(5) = fig_A(5) * d(5)
End If
If fig_A(6) = -1 Or fig_A(6) >2 * fig_A(5) Or fig_A(6) <0.5 * fig_A(5) Then
    fig_A(6) = -1
Else: fig_A(6) = fig_A(6) * d(6)
End If
'Find Amax value
fig_Amax = -1
Amax_index = 0
For i = 1 To 6
    If fig_A(i) >fig_Amax Then
        fig_Amax = fig_A(i)
        Amax_index = i
    End If
Next i
'fig_Aave calculation
    fig_Asum = 0
    A_count = 0
    For i = 1 To 6
    If fig_A(i) >0 Then
        fig_Asum = fig_Asum + fig_A(i)
        A_count = A_count + 1
    End If
    Next i
    If A_count >0 Then
    fig_Aave = fig_Asum/A_count
    Else: fig_Aave = -1
    End If
    'fig_r calculations
R_count = 0
If fig_A(2) >0 And dif(1)>0 Then
    fig_r(2) = (fig_A(2)/dif(1)) * 10
    R_count = R_count + 1
Else: fig_r(2) = -1
End If
If fig_A(3) >0 And (dif(1) + dif(3)) >0 Then
    fig_r(3) = ((fig_A(3)/(dif(1) + dif(3)) I 2)) * 10
    R_count = R_count + 1
Else: fig_r(3) = -1
End If
```

```
If fig_A(4) >0 And dif(3) >0 Then
    fig_r(4) = (fig_A(4)/dif(3)) * 10
    R_count = R_count + 1
Else: fig_r(4) = -1
End If
If fig_A(5) >0 And (dif(3) + dif(5)) >0 Then
    fig_r(5) = (fig_A(5)/(dif(3) + dif(5))) * 10
    R_count = R_count + 1
Else: fig_r(5) = -1
End If
If R_count >0 Then
    R_avg = ((fig_r(2) + fig_r(3) + fig_r(4) + fig_r(5) + 4) - R_count)/R_count
Else:R_avg = 0
End If
    'Define weight
    weight = dif(6)
    'Limit the maximum value
    If fig_A(0) >ThValue(2) Then fig_A(0) = ThValue(2)
    If fig_r(0) >ThValue(3) Then fig_r(0) = ThValue(3)
'Indicate Figs.
lbl_fig_A(0).Caption = Int(weight)
Lbl_fig_r(1).Caption = Int(fig_r(1))
Lbl_fig_r(2).Caption = Int(fig_r(2))
Lbl_fig_r(3).Caption = Int(fig_r(3))
Lbl_fig_r(4).Caption = Int(fig_r(4))
Lbl_fig_r(5).Caption = Int(fig_r(5))
Lbl_fig_r(6).Caption = Int(R_avg)
lbl_fig_A(1).Caption = Int(fig_A(1))
lbl_fig_A(2).Caption = Int(fig_A(2))
lbl_fig_A(3).Caption = Int(fig_A(3))
lbl_fig_A(4).Caption = Int(fig_A(4))
lbl_fig_A(5).Caption = Int(fig_A(5))
lbl_fig_A(6).Caption = Int(fig_A(6))
lbl_D(1).Caption = Int(d(1))
lbl_D(2).Caption = Int(d(2))
lbl_D(3).Caption = Int(d(3))
lbl_D(4).Caption = Int(d(4))
lbl_D(5).Caption = Int(d(5))
lbl_D(6).Caption = Int(d(6))
'lbl_D(6).Caption = Int(cht)
lbl_fig_A(7).Caption = Int(fig_Amax)
lbl_fig_A(8).Caption = Int(fig_Aave)
'Find number of effective areas
Aeff_index = 0
For i = 1 To 6
    If fig_A(i) >0 Then
    Aeff_index = Aeff_index + 1
    End If
Next i
'prediction
If empty_count = 7 Then 'empty
    predict = 0
Else
    If R_avg>ThValue(36) Then
    predict = 3 'Booster
Else
    If Aeff_index = 1 Then
        If fig_Amax >ThValue(100) And fig_Aave >ThValue(101) And weight>
ThValue(102) Then
            predict = 6 'adult
        Else: predict = 5 'child
        End If
    Else
        If Aeff_index = 1 And Amax_index = 1 Then
            If fig_Amax >ThValue(103) And fig_Aave >ThValue(104) And weight>
ThValue(105) Then
            predict = 6 'adult
            Else: predict= 5 'child
            End If
        Else
            If Aeff index = 1 And Amax_index = 2 Then
                If fig_Amax >ThValue(106) And fig_Aave >ThValue(107) And weight>
ThValue(108) Then
                predict = 6 'adult
                Else: predict = 5 'child
                End If
            Else
                If Aeff_index = 1 And Amax_index = 3 Then
                    If fig_Amax >ThValue(109) And fig_Aave >ThValue(110) And weight>
```

-continued

```
ThValue(111) Then
            predict = 6 'adult
        Else: predict = 5 'child
        End If
    Else
        If Aeff_index = 1 And Amax_index = 4 Then
            If fig_Amax >ThValue(112) And fig_Aave >ThValue(113) And weight>
ThValue(114) Then
            predict = 6 'adult
        Else: predict = 5 'child
        End If
    Else
        If Aeff_index = 1 And Amax_index = 5 Then
            If fig_Amax >ThValue(115) And fig_Aave >ThValue(116) And weight
>ThValue(117) Then
            predict = 6 'adult
        Else: predict = 5 'child
        End If
    Else
        If Aeff index = 1 And Amax index = 6 Then
            If fig_Amax >ThValue(118) And fig_Aave >ThValue(119) And weight
>ThValue(120) Then
            predict = 6 'adult
        Else: predict = 5 'child
        End If
    Else
        If Aeff_index = 2 And Amax_index = 1 Then
            If fig_Amax>ThValue(121) And fig_Aave >ThValue(122) And
weight >ThValue(123) Then
            predict = 6 'adult
        Else: predict = 5 'child
        End If
    Else
        If Aeff_index = 2 And Amax_index = 2 Then
            If fig_Amax>ThValue(124) And fig_Aave>ThValue(125) And
weight >ThValue(126) Then
            predict = 6 'adult
        Else: predict = 5 'child
        End If
    Else
        If Aeff_index = 2 And Amax index = 3 Then
            If fig_Amax >ThValue(127) And fig_Aave >ThValue(128) And
weight>ThValue(129) Then
            predict = 6 'adult
        Else: predict = 5 'child
        End If
    Else
        If Aeff_index = 2 And Amax_index = 4 Then
            If fig_Amax >ThValue(130) And fig_Aave >ThValue(131) And
weight >ThValue(132) Then
            predict = 6 'adult
        Else: predict = 5 'child
        End If
    Else
        If Aeff_index = 2 And Amax_index = 5 Then
            If fig_Amax >ThValue(133) And fig_Aave >ThValue(134) And
weight >ThValue(135) Then
            predict = 6 'adult
        Else: predict = 5 'child
        End If
    Else
        If Aeff_index = 2 And Amax_index = 6 Then
            If fig_Amax >ThValue(136) And fig_Aave >ThValue(137) And
weight>ThValue(138) Then
            predict = 6 'adult
        Else: predict = 5 'child
        End If
    Else
        If Aeff_index = 3 And Amax index = 1 Then
            If fig_Amax >ThValue(139) And fig_Aave >ThValue(140)
And weight>ThValue(141) Then
            predict = 6 'adult
        Else: predict = 5 'child
        End If
    Else
        If Aeff_index = 3 And Amax_index = 2 Then
            If fig_Amax >ThValue(142) And fig_Aave >ThValue(143)
And weight >ThValue(144) Then
            predict = 6 'adult
```

```
                Else: predict = 5 'child
                End If
        Else
                If Aeff_index = 3 And Amax_index = 3 Then
                        If fig_Amax >ThValue(145) And fig_Aave>ThValue(146)
And weight >ThValue(147) Then
                                predict = 6 'adult
                        Else: predict = 5 'child
                        End If
                Else
                        If Aeff_index = 3 And Amax_index = 4 Then
                                If fig_Amax >ThValue(148) And fig_Aave >ThValue(149)
And weight >ThValue(150) Then
                                        predict = 6 'adult
                                Else: predict = 5 'child
                                End If
                        Else
                                If Aeff_index = 3 And Amax_index = 5 Then
                                        If fig_Amax >ThValue(151) And fig_Aave>
ThValue(152) And weight >ThValue(153) Then
                                                predict = 6 'adult
                                        Else: predict = 5 'child
                                        End If
                                Else
                                        If Aeff_index = 3 And Amax_index = 6 Then
                                                If fig_Amax >ThValue(154) And fig_Aave>
ThValue(155) And weight >ThValue(156) Then
                                                        predict = 6 'adult
                                                Else: predict = 5 'child
                                                End If
                                        Else
                                                If Aeff_index = 4 And Amax_index = 1 Then
                                                        If fig_Amax >ThValue(157) And fig_Aave>
ThValue(158) And weight >ThValue(159) Then
                                                                predict = 6 'adult
                                                        Else: predict = 5 'child
                                                        End If
                                                Else
                                                        If Aeff_index = 4 And Amax_index = 2 Then
                                                                If fig.Amax >ThValue(160) And fig_Aave>
ThValue(161) And weight>ThValue(162) Then
                                                                        predict = 6 'adult
                                                                Else: predict = 5 'child
                                                                End If
                                                        Else
                                                                If Aeff_index = 4 And Amax_index = 3 Then
                                                                        If fig.Amax >ThValue(163) And fig_Aave>
ThValue(164) And weight >ThValue(165) Then
                                                                                predict = 6 'adult
                                                                        Else: predict = 5 'child
                                                                        End If
                                                                Else
                                                                        If Aeff_index = 4 And Amax_index = 4 Then
                                                                                If fig_Amax >ThValue(166) And fig_Aave>
ThValue(167) And weight>ThValue(168) Then
                                                                                        predict = 6 'adult
                                                                                Else: predict = 5 'child
                                                                                End If
                                                                        Else
                                                                                If Aeff_index = 4 And Amax index = 5 Then
                                                                                        If fig_Amax >ThValue(169) And fig_Aave>
ThValue(170) And weight >ThValue(171) Then
                                                                                                predict = 6 'adult
                                                                                        Else: predict = 5 Tchild
                                                                                        End If
                                                                                Else
                                                                                        If Aeff_index = 4 And Amax_index = 6 Then
                                                                                                If fig_Amax >ThValue(172) And fig_Aave>
ThValue(173) And weight>ThValue(174) Then
                                                                                                        predict = 6 'adult
                                                                                                Else: predict = 5 'child
                                                                                                End If
                                                                                        Else
                                                                                                If Aeff_index = 5 And Amax_index = 1 Then
                                                                                                        If fig_Amax>ThValue(175) And fig_Aave>
ThValue(176) And weight >ThValue(177) Then
                                                                                                                predict = 6 'adult
                                                                                                        Else: predict = 5 'child
                                                                                                        End If
```

```
        Else
              If Aeff_index = 5 And Amax_index = 2 Then
                    If fig_Amax >ThValue(178) And fig_Aave>
ThValue(179) And weight >ThValue(180) Then
                          predict = 6 'adult
                    Else: predict = 5 'child
                    End If
              Else
                    If Aeff_index = 5 And Amax_index = 3 Then
                          If fig_Amax >ThValue(181) And fig_Aave>
ThValue(182) And weight>ThValue(183) Then
                                predict = 6 'adult
                          Else: predict = 5 'child
                          End If
                    Else
                          If Aeff index = 5 And Amax_index = 4 Then
                                If fig_Amax >ThValue(184) And fig_Aave
>ThValue(185) And weight>ThValue(186) Then
                                      predict = 6 'adult
                                Else: predict = 5 'child
                                End If
                          Else
                                If Aeff_index = 5 And Amax_index = 5 Then
                                      If fig_Amax >ThValue(187) And
fig_Aave>ThValue(188) And weight >ThValue(189) Then
                                            predict = 6 'adult
                                      Else: predict = 5 'child
                                      End If
                                Else
                                      If Aeff_index = 5 And Amax_index = 6
Then
                                            If fig_Amax >ThValue(190) And
fig_Aave >ThValue(191) And weight >ThValue(192) Then
                                                  predict = 6 'adult
                                            Else: predict = 5 'child
                                            End If
                                      Else
                                            If Aeff_index = 6 And Amax_index = 1
Then
                                                  If fig_Amax >ThValue(193) And
fig_Aave >ThValue(194) And weight>ThValue(195) Then
                                                        predict = 6 'adult
                                                  Else: predict = 5 'child
                                                  End If
                                            Else
                                                  If Aeff_index = 6 And Amax_index = 2
Then
                                                        If fig_Amax>ThValue(196) And
fig_Aave >ThValue(197) And weight>ThValue(198) Then
                                                              predict = 6 'adult
                                                        Else: predict = 5 'child
                                                        End If
                                                  Else
                                                        If Aeff_index = 6 And Amax_index = 3
Then
                                                              If fig_Amax >ThValue(199) And
fig_Aave >ThValue(200) And weight>ThValue(201) Then
                                                                    predict = 6 'adult
                                                              Else: predict = 5 'child
                                                              End If
                                                        Else
                                                              If Aeff_index = 6 And Amax_index
4 Then
                                                                    If fig_Amax >ThValue(202) And
fig_Aave>ThValue(203) And weight>ThValue(204) Then
                                                                          predict = 6 'adult
                                                                    Else: predict = 5 'child
                                                                    End If
                                                              Else
                                                                    If Aeff_index = 6 And Amax_index =
5 Then
                                                                          If fig_Amax>ThValue(205) And
fig_Aave>ThValue(206) And weight >ThValue(207) Then
                                                                                predict = 6 'adult
                                                                          Else: predict = 5 'child
                                                                          End If
                                                                    Else
                                                                          If Aeff_index = 6 And Amax_index
= 6 Then
```

```
            If fig_Amax >ThValue(208) And
fig_Aave >ThValue(209) And weight >ThValue(210) Then
                                                            predict = 6 'adult
                                                        Else: predict = 5 'child
                                                        End If
                                                    Else: predict = 5 'child
                                                    End If
                                                End If
                                            End If
                                        End If
                                    End If
                                End If
                            End If
                        End If
                    End If
                End If
            End If
        End If
    End If
End If
End If
End If
End If
End If
End If
End If
End If
End If
End If
End If
End If
End If
End If
End If
End If
End If
End If
End If
End If
End If
End If
End If
End If
End If
'Prediction (Time delay)
If predict <>state_pred Then
    'reset counter if changed from previous prediction
    If predict <>Last_pred Then gPred_chg.Value = timer_pred.Interval
    If gPred_chg.Value + timer_pred.Interval >= ThValue(35) Then 'change prediction
        'Change state & indication
        state_pred = predict
        Select Case predict
            Case 0 To 4
                lbl_pred.BackColor = Val(sys_const(20 + predict))
                lbl_pred.Caption = sysconst(10 + predict)
            Case 5 To 9
                lbl_pred.BackColor = Val(sys_const(55 + predict))
                lbl_pred.Caption = sysconst(45 + predict)
        End Select
        'voice response
        If Val(sys_const(45)) = 1 Then
            Select Case predict
                Case 0 To 4
                    voice = sndPlaySound(ByVal CStr(filepath + sysconst(40 + predict)),
1)
                Case 5To 9
                    voice = sndPlaySound(ByVal CStr(filepath + sys_const(60 + predict)),
1)
            End Select
        End If
        'change airbag control
        Select Case state_pred
            Case 0 To 4
                lbl_ABctl.Caption = sys_const(25 + Val(sys_const(15 + state_pred)))
                lbl_ABctl.BackColor = Val(sysconst(27 + Val(sys_const(15 +
state_pred))))
            Case 5 To 9
                lbl_ABctl.Caption = sys_const(25 + Val(sysconst(50 + state_pred)))
```

-continued

```
            lbl_ABctl.BackColor = Val(sys_const(27 + Val(sys_const(50 +
state_pred))))
        End Select
        gPred_chg.Value = timer_pred.Interval
        gPred_chg.Visible = False
        timer_pred.Enabled = False
        'telltale light prediction
        If empty_count <>6 And predict = 3 Or predict = 5 Then 'empty
            telltale.Caption = "ON"
            telltale.BackColor = &HFFOO&
        Else
            telltale.Caption = "OFF"
            telltale.BackColor = &HEOEOEO
        End If
    Else 'delay timer
        If timer_pred.Enabled = False Then timer_pred.Enabled = True
        Select Case predict
            Case 0 To 4
                gPred_chg.ForeColor = Val(sysconst(20 + predict))
            Case 5 To 9
                gPredchg.ForeColor = Val(sysconst(55 + predict))
        End Select
        gPred_chg.Visible = True
    End If
Else 'no change(timer off)
    If timer_pred.Enabled Then timer_pred.Enabled = False
    gPred_chg.Visible = False
End If
'store this time prediction
Last_pred = predict
End Sub
```

What is claimed is:

1. A vehicle passenger detection system for sensing a characteristic of a passenger in a passenger seating area, the system comprising:
   a vehicle seat having an outer surface adjacent to the passenger seating area;
   a first electrode connected with a first portion of the vehicle seat a first distance from the outer surface;
   a second electrode connected with the first portion of the vehicle seat at a second, different distance from the outer surface, the second electrode comprising a smaller area than the first electrode; and
   a compressible insulator between the first and second electrodes.

2. The system of claim 1 wherein the first portion comprises a seat base.

3. The system of claim 1 further comprising a controller operative to determine the characteristic of the passenger as a function of first and second data from the first electrode associated with the second electrode being connected to ground and with the second electrode floating, respectively.

4. The system of claim 1 further comprising a controller operative to determine a weight of the passenger as a function of data from the first electrode.

5. The system of claim 4 wherein the controller is operative to determine a distance between the first and second electrodes and the weight is determined as a function of the distance.

6. The system of claim 1 wherein the second electrode is opposite the first electrode with a substantially common center.

7. The system of claim 1 wherein the compressible insulator comprises foam.

8. The system of claim 1 further comprising a controller operative to determine the characteristic of the passenger as a function of data from the second electrode associated with the first electrode being connected to ground.

9. The system of claim 8 wherein the controller is operative to determine a characteristic of weight as a function of the data.

10. The system of claim 9 wherein the controller is operative to determine at least one of a load of the passenger and a distance away from the seat of the passenger as a function of a measurement from the first electrode.

11. The system of claim 1 further comprising a controller operable to determine the presence of a child.

12. The system of claim 1 further comprising a third electrode adjacent the first electrode and the first distance from the outer surface.

13. The system of claim 12 further comprising a fourth electrode adjacent the second electrode, the second distance from the outer surface and opposite the third electrode wherein the first electrode is opposite the second electrode and the second and fourth electrodes are electrically connected.

14. The system of claim 13 further comprising a controller operate to determine first and second distances associated with the first and third electrodes, respectively.

15. A vehicle passenger detection method for sensing a characteristic of a passenger in a passenger seating area, the method comprising the acts of:
   (a) connecting a first electrode to ground;
   (b) measuring a first signal at a second electrode while the first electrode is connected to ground;
   (c) electrically disconnecting the first electrode;
   (d) measuring a second signal at the second electrode while the first electrode is electrically disconnected; and
   (e) determining the characteristic of the passenger in a vehicle seat as a function of the first and second signals.

16. The method of claim 15 wherein (e) comprises determining a load of the passenger.

17. The method of claim 15 wherein (e) comprises determining a distance away from the vehicle seat of the passenger.

18. The method of claim 15 further comprising:
(f) sequentially measuring third and fourth signals from at least third and fourth electrodes, respectively;
wherein (e) comprises determining the characteristic as a function of the first, second, third and fourth signals.

19. The method of claim 18 wherein at least one of the second, third and fourth electrodes is spaced a different distance from an outer surface of the passenger seat than the others of the second, third and fourth electrodes.

20. The method of claim 15 further comprising:
(f) determining a distance between the first and second electrodes as a function of the first and second signals;
wherein the first and second electrodes are separated by a compressible insulator and (e) comprises determining a weight as a function of the distance.

21. The method of claim 15 wherein (e) comprises determining a weight of the passenger.

22. The method of claim 21 further comprising:
(f) controlling activation of an airbag in response to the weight.

23. A vehicle passenger detection method for sensing an effect of a passenger in a passenger seating area, the method comprising the acts of:
(a) connecting a first electrode to ground;
(b) measuring a first signal at a second electrode while the first electrode is connected to ground, the second electrode separated from the first electrode by a compressible insulator in a vehicle seat;
(c) determining a distance between the first and second electrodes as a function of the first signal.

24. The method of claim 23 further comprising:
(d) determining a characteristic of the passenger as a function of the distance.

25. The method of claim 24 wherein (d) comprises determining a distance of the passenger away from the vehicle seat.

26. The method of claim 24 wherein (d) comprises determining a load of the passenger.

27. The method of claim 24 wherein (d) comprises determining a weight of the passenger.

28. The method of claim 23 further comprising:
(d) electrically disconnecting the first electrode from ground;
(e) measuring a second signal at the second electrode while the first electrode is disconnected from ground; and
(f) determining a characteristic of the passenger as a function of the second signal and the distance.

29. The method of claim 28 further comprising:
(g) measuring a third signal at a third electrode, the third electrode separated from the second electrode by the compressible insulator;
wherein (f) comprises determining the characteristic as a function of the second and third signals and the distance.

30. The method of claim 23 further comprising:
(d) electrically disconnecting the first electrode from ground; and
(e) measuring a second signal at the second electrode while the first electrode is disconnected from ground;
wherein (c) comprises determining the distance as a function of the first and second signals.

31. The method of claim 27 further comprising:
(e) controlling activation of an airbag as a function of the weight.

32. The method of claim 23 further comprising:
(d) determining a second distance between a third electrode and a fourth electrode.

33. The method of claim 32 further comprising:
(e) determining first and second load characteristics of the passenger as a function signals from the second and third electrodes, respectively, and the first and second distances, respectively.

34. A vehicle passenger detection system for sensing a characteristic of a passenger in a passenger seating area, the system comprising:
an compressible insulator;
a plurality of electrodes arranged in at least two layers, the electrodes of one of the at least two layers separated from the electrodes of another of the at least two layers by the compressible insulator;
a switch for connecting at least one the plurality of electrodes to ground; and
a controller operable to determine a distance between the at least two layers as a function of information received from a first of the plurality of electrodes while a second of the plurality of electrodes is grounded.

35. The system of claim 34 wherein the controller is operable to determine the distance as a function of information received from the first electrode while the second electrode is electrically floating.

* * * * *